US010819862B2

(12) United States Patent
Kodama

(10) Patent No.: US 10,819,862 B2
(45) Date of Patent: Oct. 27, 2020

(54) FAILURE DIAGNOSIS APPARATUS, FAILURE DIAGNOSIS SYSTEM, FAILURE DIAGNOSIS METHOD, AND NON-TRANSITORY RECORDING MEDIUM

(71) Applicant: Taku Kodama, Kanagawa (JP)

(72) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/268,650

(22) Filed: Feb. 6, 2019

(65) Prior Publication Data

US 2019/0306328 A1 Oct. 3, 2019

(30) Foreign Application Priority Data

Mar. 29, 2018 (JP) .................................. 2018-065657

(51) Int. Cl.
 *H04N 1/00* (2006.01)
(52) U.S. Cl.
 CPC ....... *H04N 1/00029* (2013.01); *H04N 1/0009* (2013.01); *H04N 1/00045* (2013.01); *H04N 1/00063* (2013.01); *H04N 1/00244* (2013.01); *H04N 2201/0094* (2013.01)
(58) Field of Classification Search
 CPC combination set(s) only.
 See application file for complete search history.

(56) References Cited

U.S. PATENT DOCUMENTS

2005/0248786 A1* 11/2005 Tobie .................. H04N 1/6033
 358/1.9
2010/0321712 A1* 12/2010 Toda ..................... G06F 3/1204
 358/1.9
2012/0013936 A1* 1/2012 Sawada ................ G06K 15/402
 358/1.14
2012/0130238 A1* 5/2012 Muraoka .............. A61B 6/4233
 600/436
2014/0204403 A1* 7/2014 Young ................... G06F 3/1293
 358/1.14
2016/0112581 A1* 4/2016 Kishi ................... H04N 1/6033
 358/504
2018/0182021 A1* 6/2018 Sugamata ............... H04L 67/04
2019/0238686 A1* 8/2019 Sakatani ............ H04N 1/00005
2019/0238712 A1* 8/2019 Nagasaki ................ H04L 67/02
2019/0281169 A1* 9/2019 Kawasaki .......... H04N 1/00639

FOREIGN PATENT DOCUMENTS

| JP | 2010-067068 | 3/2010 |
| JP | 2014-016437 | 1/2014 |
| JP | 2015-034807 | 2/2015 |

\* cited by examiner

*Primary Examiner* — Helen Zong
(74) *Attorney, Agent, or Firm* — Harness, Dickey & Pierce, P.L.C.

(57) ABSTRACT

A failure diagnosis apparatus includes processing circuitry. The processing circuitry calculates a unique feature value from image data read from an image formed by an image forming apparatus, calculates a common feature value from the image data, and determines a failure part based on the unique feature value and the common feature value. The unique feature value is dependent on a model of the image forming apparatus. The common feature value is independent of the model of the image forming apparatus, and is common to a plurality of models of image forming apparatuses. The failure part is a component part that forms the image forming apparatus and has an abnormality.

15 Claims, 20 Drawing Sheets

FIG. 7

| TYPE OF ABNORMAL IMAGE | PRINT PATTERN | | | | NUMBER OF PRINTS | |
|---|---|---|---|---|---|---|
| | 80% SOLID | WHITE (WHITE SHEET WITH REGISTER MARKS) | HALFTONE DITHERING PATTERN | SPECIAL PATTERN | COLOR | MONOCHROME |
| SMEAR STREAK (BLACK STREAK) | | ✓ | ✓ (FOR ALL COLORS) | | 5 | 2 |
| STREAK (WHITE STREAK) | | | ✓ (FOR ALL COLORS) | | 4 | 1 |
| WHITE VOID (WHITE DOT) | | | ✓ (FOR ALL COLORS) | | 4 | 1 |
| SMEAR (BACKGROUND FOG OR BLACK DOT) | | ✓ | ✓ (FOR ALL COLORS) | ✓ (OFFSET / AFTERIMAGE ISOLATING PATTERN) | 6 | 2 |
| FADED IMAGE | ✓ (FOR ALL COLORS) | | | | 4 | 1 |
| COLOR SHIFT | | | | ✓ | 1 | 1 |

FIG. 8

| UNIQUE FEATURE VALUE | | COMMON FEATURE VALUE | | | | COMPONENT PART (FAILURE PART) |
|---|---|---|---|---|---|---|
| COLOR MIXING | ABNORMALITY IN NON-IMAGE AREA | CONTINUITY | SPECIFIC LOCATION | SHAPE | QUANTITY | PERIODICITY |  |
| ✓ |  |  |  |  |  |  | TRANSFERRING PART |
|  |  | DISCONTINUOUS |  |  |  |  | DEVELOPING PART |
|  |  |  | NEAR FRONT SIDE OF IMAGE FORMING APPARATUS |  |  |  | DEVELOPING PART |
|  |  |  | NEAR COVER FASTENER OF DEVELOPING DEVICE |  |  |  | DEVELOPING PART |
|  |  |  |  | SHARP |  |  | DEVELOPING PART |
|  |  |  |  |  | MANY |  | DEVELOPING PART |
|  |  |  |  |  |  | CHARGING ROLLER | PCU PART |
|  |  |  |  |  |  | PHOTO-CONDUCTOR DRUM | PCU PART |
|  |  |  |  |  |  | BELT DRIVE ROLLER | TRANSFERRING PART |
|  | ✓ |  |  |  |  |  | PCU PART AND/OR TRANSFERRING PART |
|  |  |  |  |  |  |  | UNIDENTIFIABLE |

FIG. 9

| UNIQUE FEATURE VALUE | | COMMON FEATURE VALUE | | | | COMPONENT PART (FAILURE PART) |
|---|---|---|---|---|---|---|
| COLOR MIXING | ABNORMALITY IN NON-IMAGE AREA | CON-TINUITY | SPECIFIC LOCATION | SHAPE | QUANTITY | PERIODICITY | |
| ✓ | | | | | | | TRANSFERRING PART |
| | | DISCON-TINUOUS | | | | | PCDU PART |
| | | | NEAR FRONT SIDE OF IMAGE FORMING APPARATUS | | | | PCDU PART |
| | | | NEAR COVER FASTENER OF DEVELOPING DEVICE | | | | PCDU PART |
| | | | | SHARP | | | PCDU PART |
| | | | | | MANY | | PCDU PART |
| | | | | | | CHARGING ROLLER | PCDU PART |
| | | | | | | PHOTO-CONDUCTOR DRUM | PCDU PART |
| | | | | | | BELT DRIVE ROLLER | TRANSFERRING PART |
| | ✓ | | | | | | PCDU PART AND/OR TRANSFERRING PART |
| | | | | | | | UNIDENTIFIABLE |

FIG. 10

| UNIQUE FEATURE VALUE | | COMMON FEATURE VALUE | | | | COMPONENT PART (FAILURE PART) |
|---|---|---|---|---|---|---|
| COLOR MIXING | ABNORMALITY IN NON-IMAGE AREA | CON-TINUITY | SPECIFIC LOCATION | SHAPE | QUANTITY | PERIODICITY | |
| ✓ | | | | | | | TRANSFERRING PART |
| | | DISCON-TINUOUS | | | | | DEVELOPING PART |
| | | | NEAR FRONT SIDE OF IMAGE FORMING APPARATUS | | | | DEVELOPING PART |
| | | | NEAR COVER FASTENER OF DEVELOPING DEVICE | | | | DEVELOPING PART |
| | | | | SHARP | | | DEVELOPING PART |
| | | | | | MANY | | DEVELOPING PART |
| | | | | | | CHARGING ROLLER | PCU PART |
| | | | | | | PHOTO-CONDUCTOR DRUM | PCU PART |
| | | | | | | BELT DRIVE ROLLER | TRANSFERRING PART |
| | ✓ | | | | | | PCU PART AND/OR TRANSFERRING PART |
| | | | | | | | UNIDENTIFIABLE | ured
FAILURE DIAGNOSIS APPARATUS, FAILURE DIAGNOSIS SYSTEM, FAILURE DIAGNOSIS METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2018-065657 filed on Mar. 29, 2018, in the Japan Patent Office, the entire disclosure of which is hereby incorporated by reference herein.

BACKGROUND

Technical Field

The present invention relates to a failure diagnosis apparatus, a failure diagnosis system, a failure diagnosis method, and a non-transitory recording medium.

Description of the Related Art

An image forming apparatus, such as a multifunction printer, peripheral, or product (MFP), may form an abnormal image as a result of an abnormality occurring in a part of a component part forming the image forming apparatus due to an initial failure or a change over time in the part. For the event of such an abnormality in a part of a component part forming the image forming apparatus, i.e., a failure of the image forming apparatus, there has been a failure diagnosis technique for reducing a burden on a user of the image forming apparatus or a service technician in identifying the component part with an abnormality.

For example, the image forming apparatus may form a test pattern image, read the test pattern image, and determine a failure part based on a defect in the read image.

SUMMARY

In one embodiment of this invention, there is provided an improved failure diagnosis apparatus that includes, for example, processing circuitry. The processing circuitry calculates a unique feature value from image data read from an image formed by an image forming apparatus, calculates a common feature value from the image data, and determines a failure part based on the unique feature value and the common feature value. The unique feature value is dependent on a model of the image forming apparatus. The common feature value is independent of the model of the image forming apparatus, and is common to a plurality of models of image forming apparatuses. The failure part is a component part that forms the image forming apparatus and has an abnormality.

In one embodiment of this invention, there is provided an improved failure diagnosis system that includes, for example, a server including first processing circuitry and at least one image forming apparatus including second processing circuitry. The first processing circuitry and the second processing circuitry operate in cooperation to calculate a unique feature value from image data read from an image formed by the at least one image forming apparatus, calculate a common feature value from the image data, and determine a failure part based on the unique feature value and the common feature value. The unique feature value is dependent on a model of the at least one image forming apparatus. The common feature is independent of the model of the at least one image forming apparatus, and is common to a plurality of models of image forming apparatuses. The failure part is a component part that forms the at least one image forming apparatus and has an abnormality.

In one embodiment of this invention, there is provided an improved failure diagnosis method that includes, for example, acquiring image data read from an image formed by an image forming apparatus, calculating, from the image data, a common feature value that is independent of a model of the image forming apparatus and is common to a plurality of models of image forming apparatuses, calculating, from the image data, a unique feature value that is dependent on the model of the image forming apparatus, and determining a failure part based on the common feature value and the unique feature value. The failure part is a component part that forms the image forming apparatus and has an abnormality.

In one embodiment of this invention, there is provided a non-transitory recording medium storing a plurality of instructions which, when executed by one or more processors, cause the processors to perform the above-described failure diagnosis method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of a test chart table according to the first embodiment;

FIG. 8 is a diagram illustrating a first example of a failure part table according to the first embodiment;

FIG. 9 is a diagram illustrating a second example of the failure part table according to the first embodiment;

FIG. 10 is a diagram illustrating a third example of the failure part table according to the first embodiment;

Figure 1:
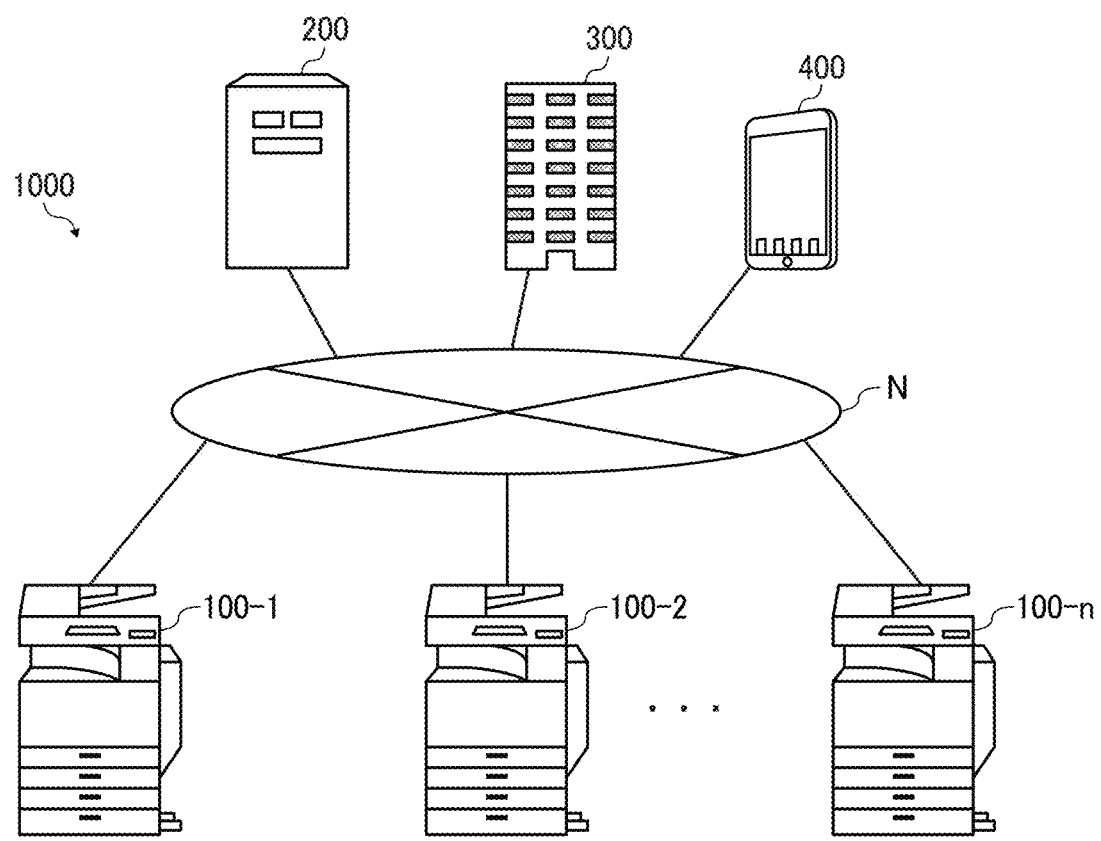
FIG. 1 is a diagram illustrating a system configuration of a failure diagnosis system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with reference to the accompanying drawings.

FIG. 1 is a diagram illustrating a system configuration of a failure diagnosis system according to a first embodiment of the present invention. As illustrated in FIG. 1, a failure diagnosis system 1000 is formed by n (n is an integer such as 1, 2, or 3) image forming apparatuses 100-1 to 100-n, a server 200, a call center apparatus 300, and a customer engineer terminal 400, which are connected via a network N. Herein, the network N is a communication line, which includes the Internet, a local area network (LAN), a facsimile line, and a telephone line, for example. A given one of the image forming apparatuses 100-1 to 100-n will hereinafter be referred to as the image forming apparatus 100.

The image forming apparatus 100, which serves as a failure diagnosis apparatus, is a printer having a printer function and a scanner function, for example. Alternatively, the image forming apparatus 100 may be a multifunction peripheral, printer, or product (MFP), i.e., an information processing apparatus having an image processing function and a communication function, such as a facsimile machine, a scanner, a copier, or a printer.

The server 200 is implemented by one or more general-purpose computers. Via the network N, the server 200 acquires operation information related to the operation of the image forming apparatus 100, or receives the operation information provided to the server 200. The operation information is information of an operation log, the execution or non-execution of a predetermined specific operation, the consumption status of a consumable, and a failure, for example. Herein, the failure refers to a situation in which an abnormality occurs in the operation of the image forming apparatus 100 or the image forming apparatus 100 forms an image with an abnormality (i.e., an abnormal image). Further, a component part of the image forming apparatus 100 causing the failure may hereinafter be referred to as the failure part.

Based on the above-described operation information, the server 200 provides, as necessary, each of the image forming apparatus 100, the call center apparatus 300, and the customer engineer terminal 400 with necessary information via the network N.

The call center apparatus 300 is installed at a call center to be used by an operator at the call center. The call center apparatus 300 is implemented by one or more general-purpose computers. Via the network N, the call center apparatus 300 answers an inquiry from a user of the image forming apparatus 100 about the image forming apparatus 100, and receives the operation information of the image forming apparatus 100 from the user of the image forming apparatus 100 or from the server 200. Then, based on the received operation information, the call center apparatus 300 provides, as necessary, the user with a suggestion of measures to address the issue of the image forming apparatus 100. Examples of the measures include replacement or replenishment of a consumable, replacement of a part, cleaning of a part, and change in various settings.

Further, based on the operation information of the image forming apparatus 100 received from the user of the image forming apparatus 100 or from the server 200, the call center apparatus 300 requests, as necessary, the customer engineer terminal 400 for measures to address the issue of the image forming apparatus 100.

The customer engineer terminal 400 receives the request for measures to address the issue of the image forming apparatus 100 from the call center apparatus 300 via the network N. Examples of the measures include replacement of a part, cleaning of a part, and change in various settings.

In response to the request for measures received by the customer engineer terminal 400, a customer engineer as a user of the customer engineer terminal 400 visits the site where the image forming apparatus 100 is installed. Then, the customer engineer takes necessary measures to address the issue of the image forming apparatus 100.

As described above with FIG. 1, in the event of a failure, the failure diagnosis system 1000 allows the user of the image forming apparatus 100 or the image forming apparatus 100 to inform the server 200 or the call center apparatus 300 of the failure via the network N. Further, the measures to address the failure are performed, as necessary, on the image forming apparatus 100 by the customer engineer.

Figure 2:
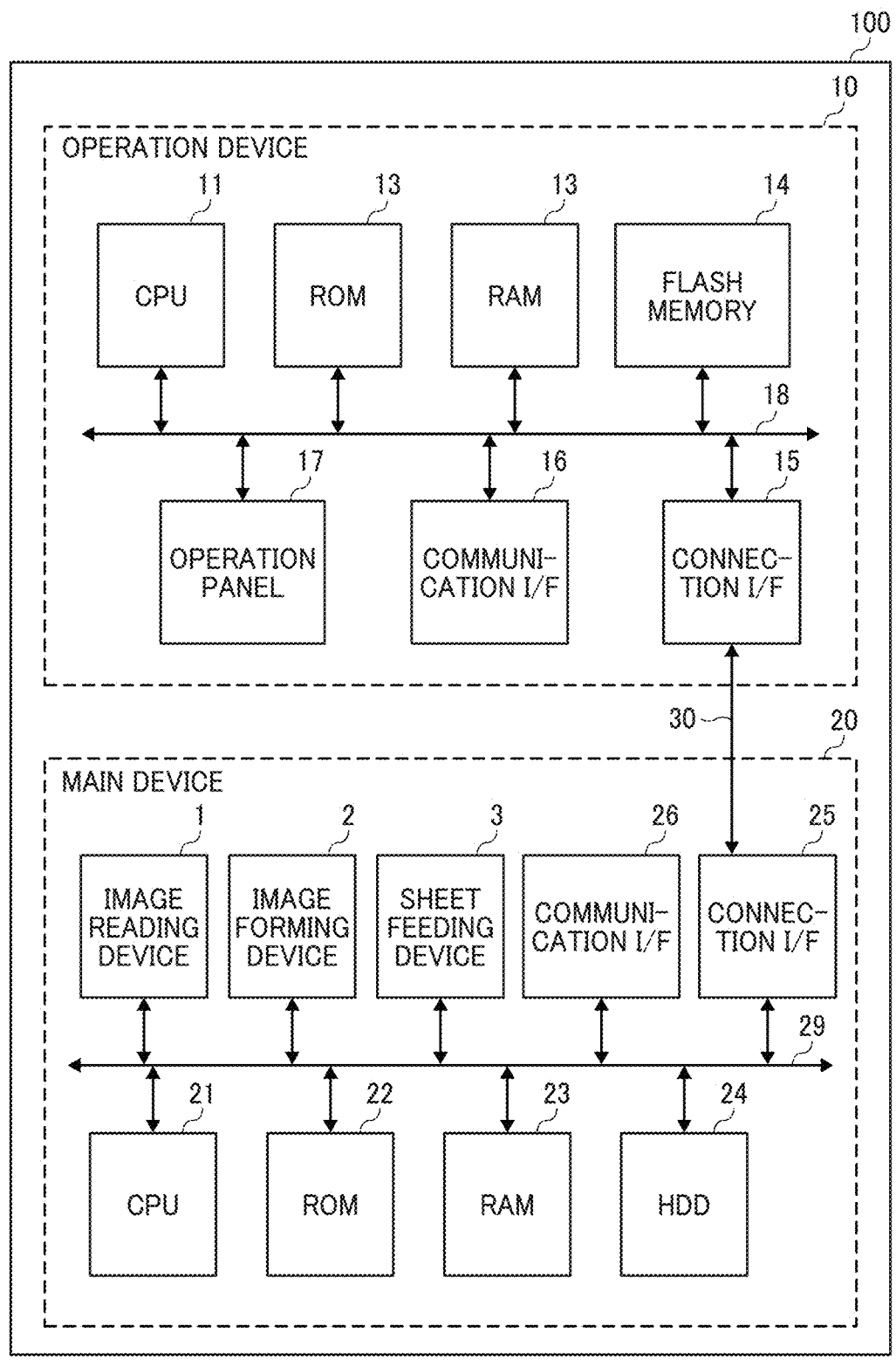
FIG. 2 is a diagram illustrating a hardware configuration of an image forming apparatus forming the failure diagnosis system according to the first embodiment.

FIG. 2 is a diagram illustrating a hardware configuration of the image forming apparatus 100 of the first embodiment. As an example of the image forming apparatus 100 of the first embodiment, an MFP will be described which has multiple functions, such as a copier function, a facsimile function, a printer function, a scanner function, and a function of storing and distributing an input image (e.g., a document image read from a sheet by the scanner function or an image input by the printer function or the facsimile function).

The image forming apparatus 100 includes an operation device 10 and a main device 20. The operation device 10 receives an operation performed by the user or the customer engineer. The main device 20 implements various functions such as the copier function, the scanner function, the facsimile function, and the printer function. Herein, "receiving an operation" is a concept including receiving information input in response to the operation. The operation device 10 and the main device 20 are connected via a dedicated communication path 30 to be able to communicate with each other. The communication path 30 may comply with a universal serial bus (USB) standard, for example, but may comply with any desired standard, whether wired or wireless.

The main device 20 operates in accordance with the operation received by the operation device 10. The main device 20, which is capable of communicating with an external apparatus such as a personal computer (PC), also operates in accordance with an instruction received from the external apparatus.

A hardware configuration of the operation device 10 will first be described.

As illustrated in FIG. 2, the operation device 10 includes a central processing unit (CPU) 11, a read-only memory (ROM) 12, a random access memory (RAM) 13, a flash memory 14, a connection interface (I/F) 15, a communication I/F 16, and an operation panel 17, which are connected to each other via a system bus 18.

The CPU 11 performs overall control of the operation of the operation device 10. Using the RAM 13 as a work area, the CPU 11 executes an operating system (OS) and various other application programs stored in the ROM 12 or the flash memory 14. Thereby, the CPU 11 controls the operation of the entire operation device 10 to implement a variety of functions, such as displaying information in accordance with input received from the user.

The ROM 12 or the flash memory 14 may store a setting widget program to display, on a home screen, a setting widget that displays the current settings of various functions such as the copier function and the printer function, for example.

The connection I/F 15 is an interface for communication with the main device 20 via the communication path 30. The communication I/F 16 is an interface for connection to the network N described with FIG. 1.

The operation panel 17 functions as an input unit to receive various inputs in accordance with the operation performed by the user or the customer engineer. The operation panel 17 also functions as a display unit to display various information (e.g., information according to the received operation, information of the operating status of the image forming apparatus 100, and information of the setting status).

The operation panel 17 as the display unit is implemented as a liquid crystal display (LCD) equipped with a touch panel function, for example, but is not limited thereto. For example, the operation panel 17 may be implemented as an organic electro-luminescence (EL) display equipped with the touch panel function. In addition to or in place of this configuration, the operation panel 17 may particularly include hardware keys in the input unit and a lamp in the display unit, for example. Further, the operation panel 17 may be implemented as a mobile information terminal usable as detached from the image forming apparatus 100.

A hardware configuration of the main device 20 will now be described.

As illustrated in FIG. 2, the main device 20 includes a CPU 21, a ROM 22, a RAM 23, a hard disk drive (HDD) 24, a connection I/F 25, a communication I/F 26, an image reading device 1, an image forming device 2, and a sheet feeding device 3, which are connected to each other via a system bus 29.

The CPU 21 controls the operation of the main device 20. Using the RAM 23 as a work area, the CPU 21 executes an OS and various other application programs stored in the ROM 22 or the HDD 24. Thereby, the CPU 21 controls the operation of the entire main device 20 to implement the above-described various functions, such as the copier function, the scanner function, the facsimile function, and the printer function. At least a part of a later-described failure diagnosis program for diagnosing a failure is also stored in the ROM 22 or the HDD 24. The operation of each of the various functions is storable in the HDD 24, for example, as the operation log of the image forming apparatus 100 each time the function is operated.

The connection I/F 25 is an interface for communication with the operation device 10 via the communication path 30. The communication I/F 26 is an interface for connection to the network N.

The image reading device 1, the image forming device 2, and the sheet feeding device 3 are hardware for performing processes for implementing the copier function, the scanner function, and the printer function other than general-purpose information processing and communication.

For example, the image reading device 1 functions as a scanner that generates image data by optically reading an image printed on a recording medium such as a sheet. Further, for example, the image forming device 2 forms (i.e., prints) an image on a recording medium such as a sheet by employing an electrophotographic method, an inkjet method, or any other method enabling printing on a sheet. Further, for example, the sheet feeding device 3 supplies the image forming device 2 with a recording medium such as a sheet, on which the image forming device 2 forms an image. A hardware configuration of the image reading device 1, the image forming device 2, and the sheet feeding device 3 will be described later with FIG. 3.

As hardware for performing processes for implementing the copier function, the scanner function, the facsimile function, and the printer function other than general-purpose information processing and communication, the main device 20 may further include a facsimile device that performs facsimile communication and a finisher that sorts printed recording media.

The main device 20 may further include a medium I/F for writing and reading to and from a variety of media.

Figure 3:
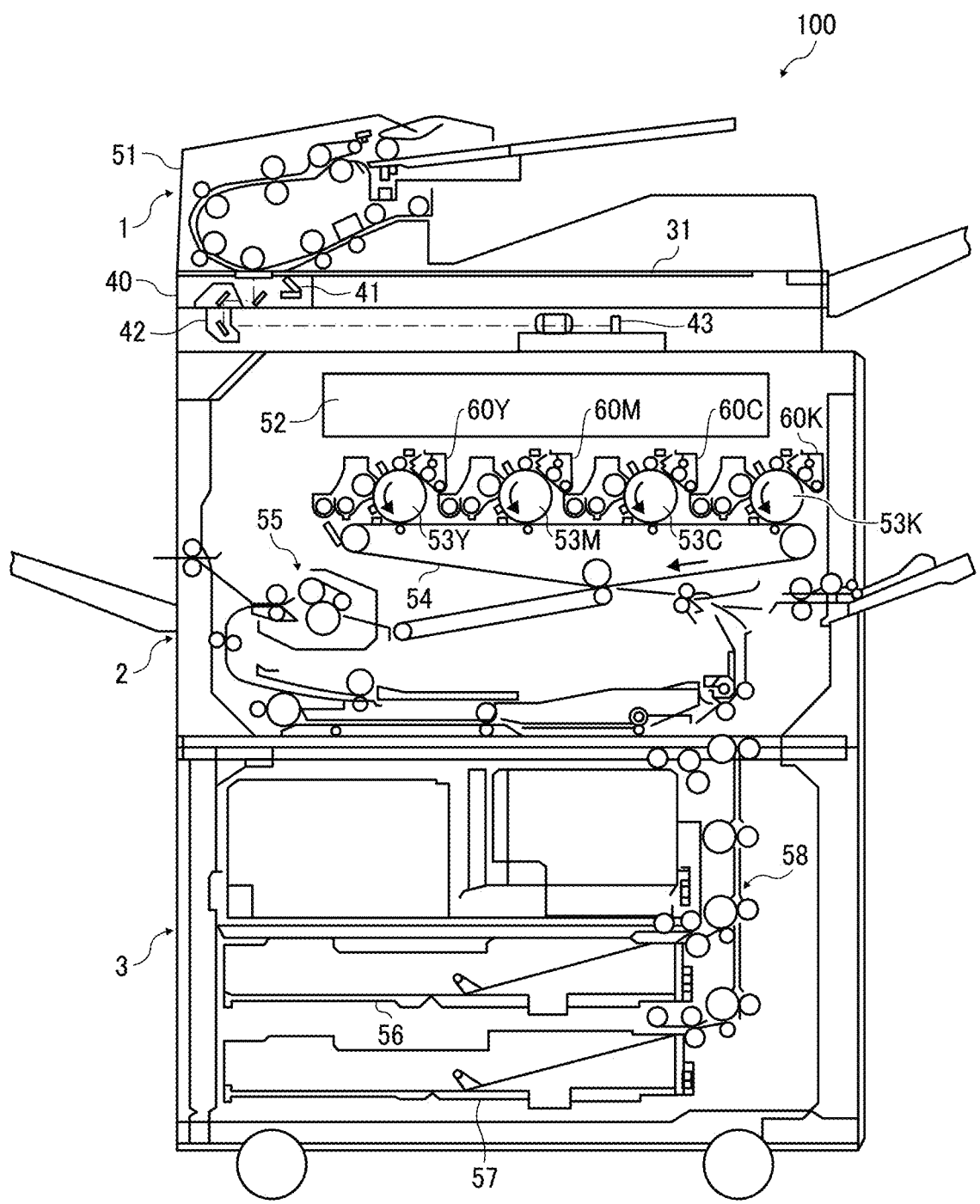
FIG. 3 is a perspective view illustrating details of the hardware configuration of the image forming apparatus according to the first embodiment.

FIG. 3 is a perspective view illustrating details of the hardware configuration of the image forming apparatus 100, as viewed from a lateral side of the image forming apparatus 100. Among the component parts of the image forming apparatus 100, component parts of the image reading device 1, the image forming device 2, and the sheet feeding device 3 described above with FIG. 2 and respective operations thereof will be particularly described with FIG. 3.

Herein, a component part of the image forming apparatus 100 may be a single part, or may be a collection of a plurality of parts implementing one function. A collection of a plurality of such collections will also be referred to as a component part.

As illustrated in FIG. 3, the image forming apparatus 100 includes the image reading device 1, the image forming device 2, and the sheet feeding device 3.

The image reading device 1 includes a contact glass 31 serving as a document reading table and an optical reading device 40. The optical reading device 40 includes a light source 41, mirrors 42, and an optical sensor 43. The optical reading device 40 emits light from the light source 41 onto the recording medium (e.g., sheet) placed on the contact glass 31, receives, at the optical sensor 43, the light reflected by the recording medium and the mirrors 42, and generates image data based on data obtained from the received light. The image reading device 1 may further include a document feeder (DF) 51, which automatically transports the recording medium onto the contact glass 31 with sheet feeding rollers.

The image forming device 2 includes an exposure device 52 and imaging devices 60Y, 60M, 60C, and 60K. Herein, the suffixes Y, M, C, and K represent yellow, magenta, cyan, and black (or key plate), respectively. The imaging devices 60Y, 60M, 60C, and 60K include photoconductor drums 53Y, 53M, 53C, and 53K, respectively. Hereinafter, the imaging devices 60Y, 60M, 60C, and 60K will be referred to as the imaging devices 60 where a description applies to all of the imaging devices 60Y, 60M, 60C, and 60K. Similarly, the photoconductor drums 53Y, 53M, 53C, and 53K will be referred to as the photoconductor drums 53 where a description applies to all of the photoconductor drums 53Y, 53M, 53C, and 53K.

Based on the image data of the image read by the image reading device 1 or a print instruction received from an external apparatus, for example, the exposure device 52 exposes the respective outer circumferential surfaces of the photoconductor drums 53 with light to form latent images thereon. As described later, the imaging devices 60 supply toners of different colors to the latent images formed on the outer circumferential surfaces of the photoconductor drums 53, to thereby develop the latent images into toner images.

The toner images developed on the photoconductor drums 53 are then transferred, via a transfer belt 54, onto the recording medium fed from the sheet feeding device 3. Thereafter, the toners of the toner images on the recording medium are fused by a fixing device 55 to fix the toner images on the recording medium as a color image.

The sheet feeding device 3 includes sheet feeding cassettes 56 and 57 and a transporting device 58. The sheet feeding cassettes 56 and 57 are capable of storing recording media of different sizes. The transporting device 58 includes various rollers that transport the recording media stored in the sheet feeding cassettes 56 and 57 to an image forming position in the image forming device 2.

Figure 4:
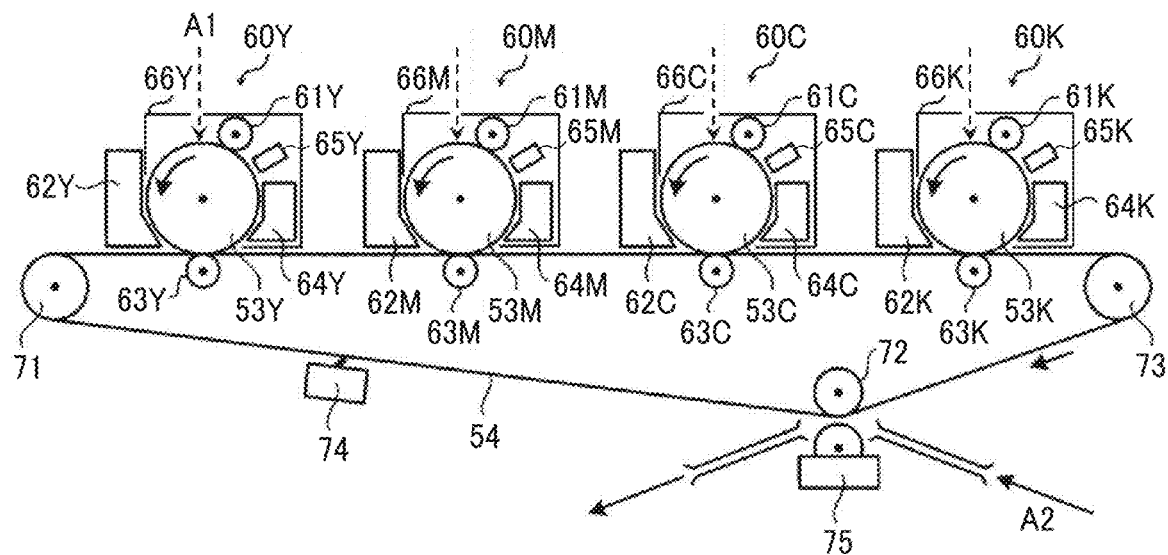
FIG. 4 is a perspective view illustrating an example of component parts of the image forming apparatus according to the first embodiment.

FIG. 4 is a perspective view illustrating an example of a schematic configuration of the imaging devices 60 and components around the imaging devices 60, as viewed from a lateral side of the image forming apparatus 100. The imaging devices 60Y, 60M, 60C, and 60K are similar in configuration, and thus the following description will be limited to component parts of the imaging device 60Y and respective operations thereof.

The imaging device 60Y includes the photoconductor drum 53Y, a charging device 61Y, a developing device 62Y, a transferring device 63Y, a cleaning device 64Y, and a discharging device 65Y. The photoconductor drum 53Y functions as a photoconductor. The charging device 61Y, the developing device 62Y, the transferring device 63Y, the cleaning device 64Y, and the discharging device 65Y are arranged around the photoconductor drum 53Y.

Hereinafter, a part or all of a component part forming the charging device 61Y may be referred to as the charging part, and a part or all of a component part forming the developing device 62Y may be referred to as the developing part. Similarly, a part or all of a component part forming the transferring device 63Y may be referred to as the transferring part, and a part or all of a component part forming the cleaning device 64Y may be referred to as the cleaning part. Further, a part or all of a component part forming the discharging device 65Y may be referred to as the discharging part. This applies not only to the charging device 61Y, the developing device 62Y, the transferring device 63Y, the cleaning device 64Y, and the discharging device 65Y, but also to other devices implementing functions of the image forming apparatus 100. For example, a part or all of a component part forming the exposure device 52 may be referred to as the exposing part.

Returning to the description of the component parts and the respective operations thereof, in image formation, the outer circumferential surface of the photoconductor drum 53Y is uniformly charged by the charging device 61Y in the dark, and then is exposed to light corresponding to a yellow image, which is emitted from the exposure device 52, as indicated by a broken arrow A1 in FIG. 4. Consequently, an electrostatic latent image is formed on the outer circumferential surface of the photoconductor drum 53Y. The developing device 62Y visualizes the electrostatic latent image with yellow toner. Thereby, a yellow toner image is formed on the photoconductor drum 53Y. The yellow toner image formed on the photoconductor drum 53Y is transferred onto the transfer belt 54, which is stretched around belt drive rollers 71, 72, and 73 and rotates clockwise.

Similarly as in the imaging device 60Y, the respective toner images formed on the photoconductor drums 53M, 53C, and 53K in the imaging devices 60M, 60C, and 60K are sequentially transferred onto the transfer belt 54. Consequently, a color image having four color images superimposed upon each other is formed on the transfer belt 54. The color image formed on the transfer belt 54 is then transferred onto the recording medium transported to a second transfer unit 75, as indicated by a solid arrow A2 in FIG. 4. Thereby, the color images having the four color images superimposed upon each other is formed on the recording medium.

Thereafter, the fixing device 55 applies heat and pressure to the recording medium to fix the color image on the recording medium. The recording medium with the color image fixed thereon is ejected to the outside of the image forming apparatus 100. Residual toner remaining on the transfer belt 54 is removed by a cleaning device 74 after the image transfer process.

In the imaging device 60Y, the parts of the photoconductor drum 53Y and some of the devices arranged around the photoconductor drum 53Y, i.e., the charging device 61Y, the cleaning device 64Y, and the discharging device 65Y, are integrated as one unit to be replaced together. This unit may hereinafter be referred to as the photoconductor unit (PCU) 66Y.

Figure 5:
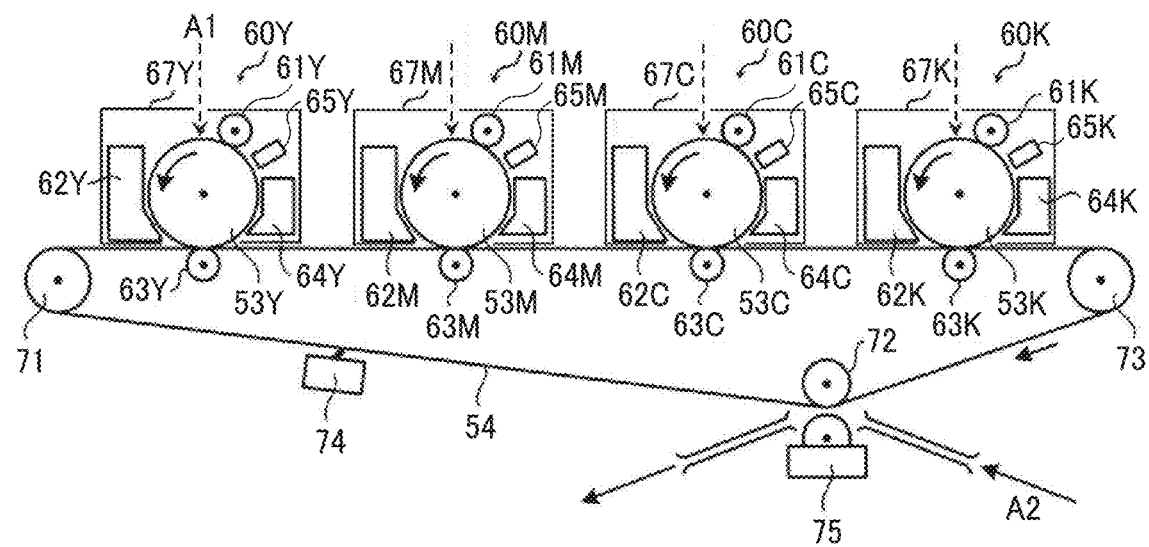
FIG. 5 is a perspective view illustrating another example of component parts of the image forming apparatus according to the first embodiment.

FIG. 5 is a perspective view illustrating another example of the schematic configuration of the imaging devices 60 and components around the imaging devices 60. In the imaging device 60Y illustrated in FIG. 4, the component parts included in the PCU 66Y are replaceable together. Meanwhile, in the imaging device 60Y illustrated in FIG. 5, the parts of the photoconductor drum 53Y, the charging device 61Y, the developing device 62Y, the cleaning device 64Y, and the discharging device 65Y are integrated as a photoconductor-development unit (PCDU) 67Y to be replaced together.

As an alternative to the examples of component parts described above with FIGS. 4 and 5, a light emitting diode array (LEDA) may be provided for each of the photoconductor drums 53 as the exposure device 52 in FIG. 3. In this case, the PCU 66Y or the PCDU 67Y may include the LEDA.

As described above, the image forming method employed by the image forming apparatus 100 is not limited to the electrophotographic method illustrated in FIGS. 2 to 5, and may be another image forming method such as the inkjet method. For the image forming apparatus 100 employing such an image forming method, different models with different component parts are designed.

Specific examples of models of an electrophotographic image forming apparatus including component parts such as those described above with FIGS. 3 to 5 include the following first to fourth models.

The first model is a color (YMCK) model with the developing part, the transferring part, and the PCU part being integrated together.

The second model is a color (YMCK) model with the developing part, the transferring part, and the PCU part being separated from each other.

The third model is a color (YMCK) model with the transferring part and the PCDU part being integrated together.

The fourth model is a color (YMCK) model with the transferring part and the PCDU part being separated from each other.

Although the model described with FIGS. 3 to 5 uses the four colors YMCK, there are other models such as a so-called monochrome model using only the K color and a model including an imaging device with a transparent toner in addition to the imaging devices with the toners of four colors YMCK. Specific examples of models different in the number of output colors include the following fifth to eighth models.

The fifth model is a monochrome (K) model with the developing part, the transferring part, and the PCU part being integrated together.

The sixth model is a monochrome (K) model with the developing part, the transferring part, and the PCU part being separated from each other.

The seventh model is a color (YMCK+transparent) model with the developing part, the transferring part, and the PCU part being integrated together.

The eighth type model is a color (YMCK+transparent) model with the developing part, the transferring part, and the PCU part being separated from each other.

Figure 6:
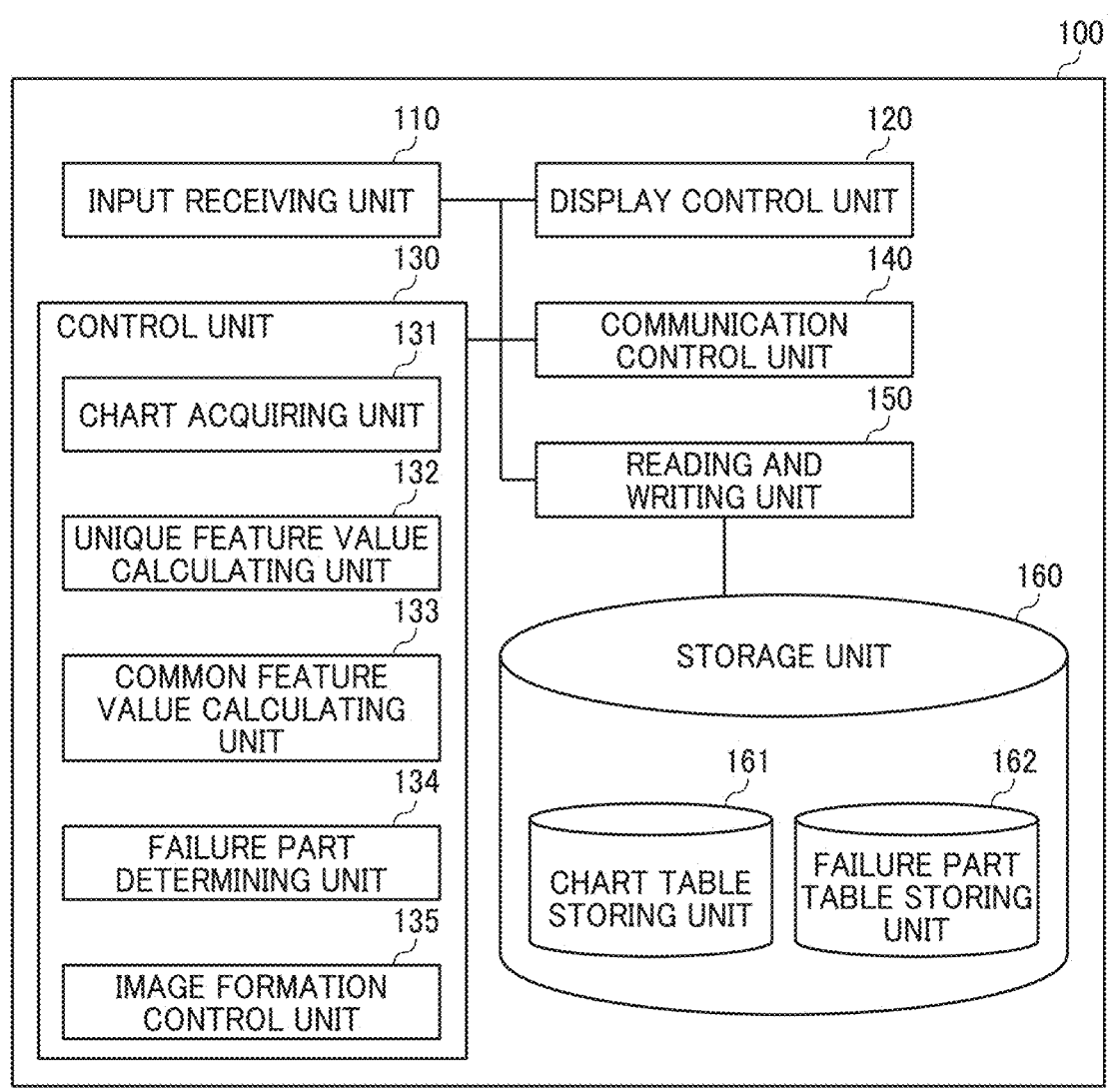
FIG. 6 is a functional block diagram of the image forming apparatus according to the first embodiment.

FIG. 6 is a functional block diagram of the image forming apparatus 100. The image forming apparatus 100 includes an input receiving unit 110, a display control unit 120, a control unit 130, a communication control unit 140, a reading and writing unit 150, and a storage unit 160.

The input receiving unit 110 is implemented by the processing of the operation device 10. The input receiving unit 110 executes functions such as displaying information necessary for an operator to perform an operation and receiving various inputs performed by the operator. Herein, the operator refers to the person who operates the image forming apparatus 100, such as the user of image forming apparatus 100 or the customer engineer.

The display control unit 120 is implemented when the CPU 11 executes programs stored in the ROM 12 or the flash memory 14 by using the RAM 13 as a work area. The display control unit 120 executes a function of controlling a display screen displayed on the operation panel 17. Alternatively, the display control unit 120 may be implemented when the CPU 21 executes programs stored in the HDD 24 by using the RAM 23 as a work area.

The control unit 130 is implemented when the CPU 21 executes programs stored in the ROM 22 or the HDD 24 by using the RAM 23 as a work area. The control unit 130 executes functions of the entire image forming apparatus 100, such as the copier function, the scanner function, the printer function, and the facsimile function, for example. Alternatively, depending on the control to be performed by the control unit 130, the control unit 130 may be implemented when the CPU 11 executes programs stored in the ROM 12 or the flash memory 14 by using the RAM 13 as a work area.

The control unit 130 includes a chart acquiring unit 131, a unique feature value calculating unit 132, a common feature value calculating unit 133, a failure part determining unit 134, and an image formation control unit 135. Details of these units included in the control unit 130 will be described later with reference to flowcharts of processing procedures.

The communication control unit 140 is implemented by the processing of the communication I/F 16 or the communication I/F 26. The communication control unit 140 executes functions such as transmitting image information to an external apparatus via electronic mail, and if it is possible to set a variety of setting information from an external apparatus, communicating with the external apparatus via a network.

The reading and writing unit 150 is implemented when the CPU 21 executes programs stored in the ROM 22 or the HDD 24 by using the RAM 23 as a work area. The thus-implemented reading and writing unit 150 executes functions such as storing a variety of data in the storage unit 160 and reading a variety of data stored in the storage unit 160.

The reading and writing unit 150 is also implemented when the CPU 11 executes programs stored in the ROM 12 or the flash memory 14 by using the RAM 13 as a work area. The thus-implemented reading and writing unit 150 executes functions such as storing a variety of data in the storage unit 160 and reading a variety of data stored in the storage unit 160.

The storage unit 160 is implemented by the processing of the ROM 22 or the HDD 24. The thus-implemented storage unit 160 executes a function of storing programs, document data, various setting information used to operate the image forming apparatus 100, and the operation log of the image forming apparatus 100, for example. Alternatively, the storage unit 160 may be implemented by a temporary storage function of the RAM 23.

The storage unit 160 is also implemented by the processing of the ROM 12 or the flash memory 14. The thus-implemented storage unit 160 executes a function of storing programs, document data, various setting information used to operate the image forming apparatus 100, and the operation log of the image forming apparatus 100, for example. Alternatively, the storage unit 160 may be implemented by a temporary storage function of the RAM 13.

The storage unit 160 includes a chart table storing unit 161 and a failure part table storing unit 162. The chart table storing unit 161 previously stores a test chart table that associates types of the abnormal image (e.g., smear streak and color shift) with test charts.

The test charts will now be described.

To eliminate or improve the abnormal image, data of various features of the abnormal image, such as the location, extent, and characteristics of the abnormal image, is acquired. Hereinafter, such data of features of the abnormal image may be referred to as the feature values. The feature values are different depending on the type of the abnormal image, and thus print patterns suitable for acquiring the feature values are also different. That is, the print pattern according to the type of the abnormal image is selected and printed as the test chart, to thereby acquire effective feature values for eliminating or improving the abnormal image.

Therefore, the chart table storing unit 161 previously stores the test chart table that associates the types of abnormal image with test charts suitable for acquiring the feature values from the types of abnormal image. Details of the test chart table will be described later.

The failure part table storing unit 162 previously stores failure part tables that associate the feature values calculated from the test charts with failure parts. The failure part table storing unit 162 stores the failure part tables selected in accordance with the model of the image forming apparatus 100. Details of the failure part tables will be described later.

FIG. 7 illustrates an example of the test chart table. The leftmost column of the test chart table includes six abnormal image types: smear streak (black streak), streak (white streak), white void (white dot), smear (background fog or black dot), faded image, and color shift. The type of the abnormal image in each of the rows of the test chart table is associated with a print pattern with a check mark as the test chart.

For example, if the type of the abnormal image is smear streak (black streak), this abnormal image type is associated with two print patterns, i.e., a white (white sheet with register marks) print pattern and a halftone dithering pattern, as test charts. The column of the halftone dithering pattern includes cells each with a check mark and a description "FOR ALL COLORS." This indicates that the abnormal image type corresponding to any of these cells is associated with halftone dithering patterns for all colors that the image forming apparatus 100 is capable of outputting.

Further, the row of smear streak (black streak) includes numbers "5" and "2" for color and monochrome, respectively, in the column of the number of prints. These numbers represent the total number of test charts to be printed for the color model and the total number of test charts to be printed for the monochrome model. That is, if the type of the abnormal image is smear streak (black streak), and if the image forming apparatus 100 is the color model, the image forming apparatus 100 prints five test charts in total: one test chart of the white (white sheet with register marks) print pattern and four test charts of the halftone dithering pattern for the YMCK colors. If the type of the abnormal image is smear streak (black streak), and if the image forming apparatus 100 is the monochrome model, the image forming apparatus 100 prints two test charts in total: one test chart of the white (white sheet with register marks) print pattern and one test chart of the halftone dithering pattern for the K color. The test chart table illustrated in FIG. 7 includes the number of test charts to be printed for each of the color model and the monochrome model in the column of the number of prints.

FIGS. 8, 9, and 10 illustrate examples of the failure part table. The failure part table associates the feature values calculated for a certain type of abnormal image with failure parts. The abnormal image is classified into various types, as illustrated in FIG. 7, for example. Each of FIGS. 8, 9, and 10 illustrates a failure part table for black streak as an example of the abnormal image. The following description will be limited to the failure part table for black streak, as an example. However, the failure part table is prepared for each of the other types of the abnormal image illustrated in FIG. 7.

FIG. 8 is a failure part table applied to the aforementioned second model: the color (YMCK) model with the developing part, the transferring part, and the PCU part being separated from each other. FIG. 9 is a failure part table applied to the aforementioned fourth model: the color (YMCK) model with the transferring part and the PCDU part being separated from each other. FIG. 10 is a failure part table applied to the aforementioned sixth model: the monochrome (K) model with the developing part, the transferring part, and the PCU part being separated from each other.

In FIG. 8, the failure part table includes seven types of feature values representing features of the abnormal image. The types of feature values will be described below with black streak, i.e., a linear abnormal image stretching in the transport direction of the recording medium, as an example of the abnormal image.

Color mixing is a feature value indicating whether the streak of each color included in the image formed by the image forming apparatus 100 is mixed with another color.

Abnormality in non-image area is a feature value indicating whether the streak appears in a margin, i.e., a non-image area of the recording medium, in which no image is supposed to be formed.

Depending on the structure of the model, it is unnecessary to calculate these feature values (i.e., color mixing and abnormality in non-image area) to determine the failure part. Such feature values will hereinafter be referred to as the model-unique feature values. For example, color mixing does not occur in the monochrome model that uses a single color. It is therefore unnecessary to calculate color mixing in this case. A model not requiring the calculation of abnormality in non-image area will be described later.

Continuity is a feature value indicating whether the black streak stretches without a break. Specific location is a feature value indicating whether the location of the black streak is a specific location. Shape is a feature value representing the degree of sharpness of the black streak, i.e., the sharpness of the outline of the black streak. Quantity is a feature value representing the quantity of the black streak, such as a few streaks or many streaks, for example. Periodicity is a feature value indicating whether the black streak has periodic gradation in the sub-scanning direction, i.e., the transport direction of the recording medium, and if so, the feature of the period (e.g., being equal to the rotation period of charging rollers of the charging devices 61, the photoconductor drums 53, or the belt drive rollers 71, 72, and 73).

Unlike the first and second feature values (i.e., color mixing and abnormality in non-image area), the third to seventh feature values (i.e., continuity, specific location, shape, quantity, and periodicity) are calculated for all models of the image forming apparatus 100. Such feature values will hereinafter be referred to as the common feature values.

A description in each of the columns of the feature values indicates that, when the feature value corresponding to the description is calculated, the corresponding component part described in the rightmost column is the failure part. For example, if a feature value indicating the occurrence of color mixing is calculated for the black streak as the abnormal image, the transferring part is suspected to be the failure part. Further, if a feature value indicating abnormality in non-image area of the black streak is calculated, the PCU part and/or the transferring part are/is suspected to be the failure part. Further, if a feature value indicating discontinuity of the black streak is calculated, the developing part is suspected to be the failure part. Further, if a feature value is calculated which indicates that the location of the black streak is the specific location, specifically near the front side of the image forming apparatus 100, the developing part is suspected to be the failure part. If a feature value is calculated which indicates that the location of the black streak is the specific location, specifically near a cover fastener of a developing device 62, the developing part is suspected to be the failure part.

Description will now be given of the failure part table illustrated in FIG. 9, i.e., the failure part table applied to the fourth model: the color (YMCK) model with the transferring part and the PCDU part being separated from each other. That is, the failure part table illustrated in FIG. 9 is applied to the model in which the components of the PCDU including the developing part are replaced together. According to the failure part table illustrated in FIG. 8, if the feature value of specific location, shape, or quantity is calculated, the developing part is suspected to be the failure part. According to the failure part table illustrated in FIG. 9, on the other hand, if the feature value of specific location, shape, or quantity is calculated, the PCDU part is suspected to be the failure part. As described above with FIG. 8, if the feature value indicating abnormality in non-image area is calculated, the PCU part and/or the transferring part are/is suspected to be the failure part. According to the failure part table illustrated in FIG. 9, on the other hand, the PCDU part and/or the transferring part are/is suspected to be the failure part. Even if the feature value indicating abnormality in non-image area is calculated, therefore, the calculated feature value is not useful as information for narrowing down the failure part. Accordingly, it is unnecessary to calculate abnormality in non-image area for the model to which the failure part table in FIG. 9 is applied. In the failure part table of FIG. 9, the column of abnormality in non-image area is hatched gray to clarify this difference from the failure part table of FIG. 8. The remaining parts of the failure part table in FIG. 9 are similar to those of the failure part table in FIG. 8, and thus description thereof will be omitted.

The failure part table illustrated in FIG. 10 will now be described.

Since this failure part table is applied to the monochrome model, the image forming apparatus 100 only uses the K color toner. Accordingly, the feature value of the abnormal image indicating the occurrence of color mixing will not be calculated. It is therefore unnecessary to calculate the model-unique feature value of color mixing, and thus to associate this feature value with a component part in the failure part table. In the failure part table of FIG. 10, the column of color mixing is hatched gray to clarify this difference from the failure part table of FIG. 8. The remaining parts of the failure part table in FIG. 10 are similar to those of the failure part table in FIG. 8, and thus description thereof will be omitted.

In accordance with the model of the image forming apparatus 100, an appropriate failure part table, such as one of the failure part tables illustrated in FIGS. 8 to 10, is selected and stored. However, this does not mean that each of the models needs to have a different failure part table. That is, different models may use the same failure table as long as the failure part is identifiable in the different models with the same model-unique feature value.

Further, in the failure part table, the component part associated with a feature value as the failure part may be at least a part of the component part as the failure part. That is, it is possible to efficiently perform failure diagnosis by appropriately selecting a component part that is relatively frequently identified as the failure part or a component part that, when fixed (e.g., replaced), substantially improves the abnormal image.

Figure 11:
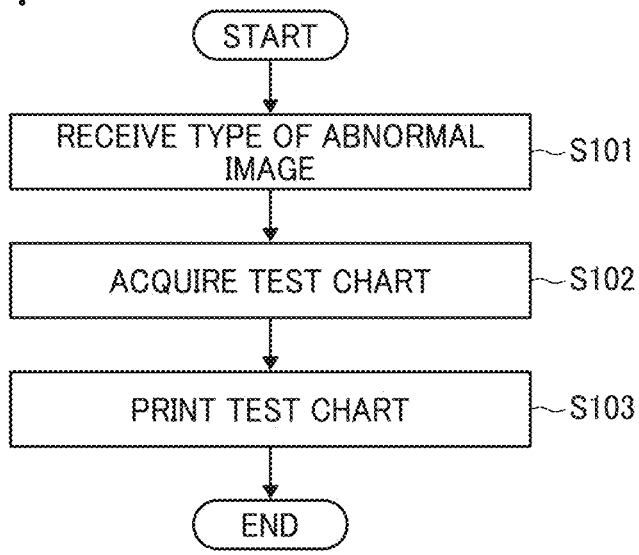
FIG. 11 is a flowchart illustrating an example of the procedure of a test chart printing process according to the first embodiment.

FIG. 11 illustrates an example of the procedure of a test chart printing process according to the first embodiment. This procedure starts when the input receiving unit 110 of the image forming apparatus 100 receives the type of abnormal image that the operator desires to improve. As described later, the operator may be guided by a display on the operation panel 17 to input the type of abnormal image.

As an abnormal image type receiving process, the input receiving unit 110 first receives the input abnormal image type (step S101). As a chart acquiring process, after the receipt of the abnormal image type, the chart acquiring unit 131 refers to the test chart table in the chart table storing unit 161 via the reading and writing unit 150, and acquires the test chart corresponding to the input abnormal image type (step S102). The chart acquiring unit 131 transfers the acquired test chart to the image formation control unit 135. Then, as the test chart printing process, the image formation control unit 135 prints the acquired test chart (step S103).

Figure 12:
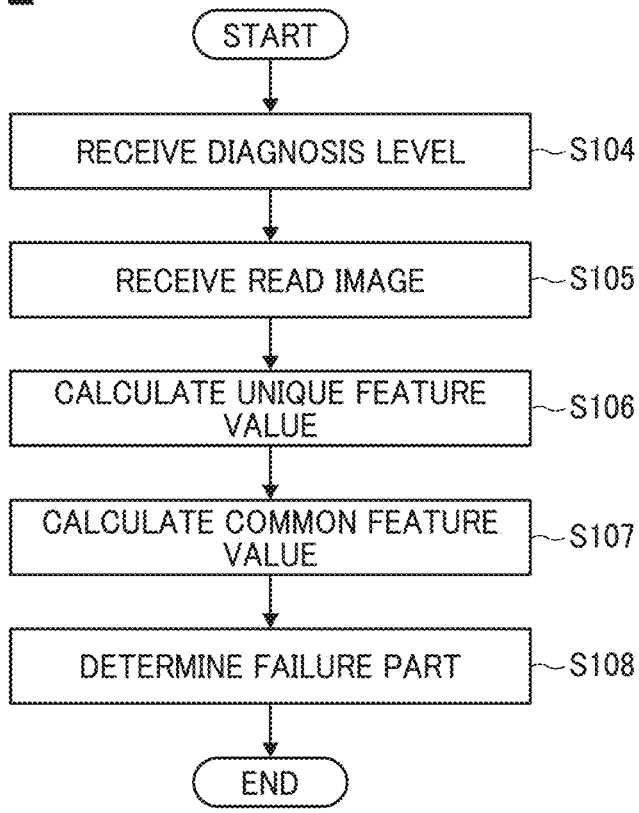
FIG. 12 is a flowchart illustrating an example of the procedure of a failure part determining process according to the first embodiment.

FIG. 12 illustrates an example of the procedure of a failure part determining process according to the first embodiment. This procedure starts when the level of failure diagnosis desired by the operator is input via the operation panel 17 of the image forming apparatus 100. As described later, the operator may be guided by a display on the operation panel 17 to input the level of failure diagnosis.

As a diagnosis level receiving process, the input receiving unit 110 first receives the input diagnosis level (step S104). Herein, the diagnosis level is the level of calculation of the feature values for the diagnosis, and is selectable by the operator between a simplified level and a detailed level.

Then, with the DF 51, for example, the operator causes the image forming apparatus 100 to read the test chart printed at step S103 in FIG. 11. Then, as an image receiving process, the input receiving unit 110 receives image data as a result of reading the test chart (step S105). As described later, the operator may be guided by a display on the operation panel 17 to cause the image forming apparatus 100 to read the test chart.

Then, as a unique feature value calculating process, the unique feature value calculating unit 132 calculates the model-unique feature value from the image data resulting from reading the test chart (step S106). Then, as a common feature value calculating process, the common feature value calculating unit 133 calculates the common feature value from the image data (step S107). Step S106 may precede or follow Step S107. Further, Steps S106 and S107 may be simultaneously performed.

Then, as a failure part determining process, the failure part determining unit 134 refers to the failure part table based on the calculated model-unique feature value and common feature value, and determines the failure part as at least a part of a diagnosis result (step S108).

The unique feature value calculating unit 132 may previously be configured to calculate the model-unique feature value according to the model of the image forming apparatus 100 or to calculate only the model-unique feature value described in the failure part table.

As described above, in the first embodiment, the failure diagnosis is performed based on the model-unique feature value and the common feature value. The model-unique feature value depends on the model (different models include different component parts), while the common feature value is calculated regardless of the model of the image forming apparatus 100. According to the first embodiment, therefore, when it is meaningless to calculate a certain feature value (i.e., model-unique feature value) for a certain model, the calculation of such a model-unique feature value is omitted, thereby eliminating unnecessary man-hours. Further, the common feature value calculating unit 133 is installable in all models as a component common to all models. It is therefore possible to standardize the common feature value calculating unit 133 as a diagnosing tool and thereby reduce man-hours for a development process.

A description will now be given of an example of the procedures in FIGS. 11 and 12 executed when the image forming apparatus 100 to be diagnosed is the aforementioned second model: the color (YMCK) model with the developing part, the transferring part, and the PCU part being separated from each other.

In this case, the failure part table storing unit 162 stores the failure part table illustrated in FIG. 8. The unique feature value calculating unit 132 is previously configured to calculate color mixing and abnormality in non-image area as the model-unique feature values. Alternatively, the unique feature value calculating unit 132 may be configured to calculate color mixing and abnormality in non-image area as the model-unique feature values by referring to the failure part table in FIG. 8.

The following description will be given on an example in which the following results are acquired from the unique feature value calculation process and the common feature value calculation process: the abnormal image does not have color mixing or abnormality in non-image area, and the abnormal image is continuous, observed at a location other than the specific location, sharp in shape, many in quantity (dozens), and not periodic.

As described in the above results, the feature value indicating that the shape of the abnormal image is sharp is calculated. In this example, the image forming apparatus 100 is the second model: the color (YMCK) model with the developing part, the transferring part, and the PCU part being separated from each other. Therefore, the failure part table of FIG. 8 corresponding to the second model is referred to. In the failure part table of FIG. 8, the developing part is listed in the column of the component part as the failure part corresponding to this feature value. Therefore, the failure part determining unit 134 determines the failure part as the developing part.

As well as the feature value as to the shape of the abnormal image, the feature value indicating that the quantity of the abnormal image is many is also calculated in the above results. When the failure part table of FIG. 8 is similarly referred to, the developing part is again listed as the failure part corresponding to this feature value. Therefore, the failure part determining unit 134 determines the failure part as the developing part. Even if a plurality of different feature values are thus calculated, therefore, it is possible to identify the respective component parts corresponding to the plurality of different feature values by referring to the failure part table.

Depending on the condition of the image forming apparatus 100, different component parts, such as the developing part and the transferring part, for example, may simultaneously have abnormalities. In this case, a plurality of feature values corresponding to the respective abnormalities are calculated. Then, the failure part table is referred to for each of the calculated plurality of feature values, and a plurality of parts, i.e., the developing part and the transferring part in this case, are identified to be the component parts as the failure parts.

As another example, if the image forming apparatus 100 to be diagnosed is the sixth model: the monochrome (K) model with the developing part, the transferring part, and the PCU part being separated from each other, the failure part table in FIG. 10 is referred to. In this case, the feature values to be calculated are abnormality in non-image area (i.e., a model-unique feature value) and continuity, specific location, shape, quantity, and periodicity (i.e., common feature values).

With reference to the test chart table in FIG. 7, two images are output as test charts. The respective feature values are calculated from the prints of the two images. The feature values to be calculated vary depending on the model. In the sixth model: the monochrome (K) model with the developing part, the transferring part, and the PCU part being separated from each other, it is unnecessary to calculate the model-unique feature value of color mixing. With the calculation of color mixing being omitted, therefore, the time taken for failure diagnosis is reduced.

Figure 13:
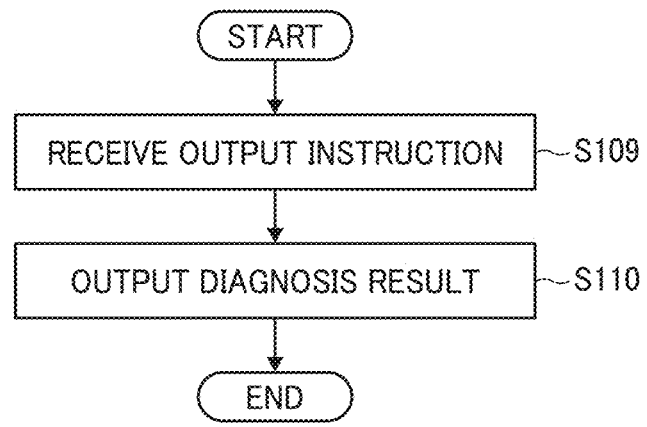
FIG. 13 is a flowchart illustrating an example of the procedure of a failure part determination result outputting process according to the first embodiment.

FIG. 13 illustrates an example of the procedure of a failure part determination result outputting process according to the first embodiment. This procedure starts when a failure diagnosis result output method desired by the operator is input via the operation panel 17 of the image forming apparatus 100. As described later, the operation panel 17 may display a screen that guides the operator of the operation panel 17 to input the failure diagnosis result output method, for example.

As an output instruction receiving process, the input receiving unit 110 receives from the operation panel 17 an instruction as to the output method (step S109). Then, as an output process, the control unit 130 outputs the failure diagnosis result including at least the failure part (step S110).

As an example of the method of outputting the failure diagnosis result, the failure diagnosis result may be transmitted to a preset destination, such as the server 200 or the call center apparatus 300. This method enables the operator to automatically notify the server 200 or the call center apparatus 300 of the failure diagnosis result and promptly receive necessary measures.

As another example of the method of outputting the failure diagnosis result, the image formation control unit 135 may print the failure diagnosis result, or the display control unit 120 may display the failure diagnosis result on the operation panel 17. This method enables the operator to, based on the printed or displayed failure diagnosis result, facsimile-transmit the failure diagnosis result to a customer service, talk with a customer service representative on the phone while looking at the failure diagnosis result, or contact the customer service via electronic mail or the Internet. As a still another example of the method of outputting the failure diagnosis result, the failure diagnosis result may be stored in a storage device such as the HDD 14. However, the method of outputting the failure diagnosis result is not limited to those described above.

The image forming apparatus 100 performs the failure diagnosis according to the model of the image forming apparatus 100 and outputs the failure diagnosis result, as described above. Consequently, the man-hours from the occurrence of a failure to the completion of measures taken by the customer engineer are reduced. That is, according to an existing technique, the operator in the failure diagnosis system 1000 illustrated in FIG. 1, for example, informs the call center apparatus 300 of the information of the abnormal image desired to be improved and other information including the operation information of the image forming apparatus 100. Then, based on such information, the customer engineer makes preparations for measures to address the failure with a replacement part to replace a component part suspected of having an abnormality, for example, and visits the installation site of the image forming apparatus 100. The customer engineer then actually checks the image forming apparatus 100, identifies the failure part, and takes necessary measures. If a part required for the measures is missing, the customer engineer may revisit the site after obtaining the part, or may make arrangements to obtain the part by requesting the part to be delivered to the site, for example.

By contrast, the image forming apparatus 100 of the first embodiment determines the failure part based on the abnormal image, and outputs the failure diagnosis result beforehand. It is therefore possible to obtain, in advance, the information of the failure part via the network N, and thus avoid a situation in which the customer engineer finds that a necessary part is missing after visiting the installation site of the image forming apparatus 100. Further, when the operator directly contacts the call center apparatus 300, the image forming apparatus 100 of the first embodiment allows the operator to precisely deliver necessary information to a customer service representative. Consequently, the man-hours until the completion of the measures are reduced.

A second embodiment of the present invention will now be described.

According to the second embodiment, a part of the above-described failure diagnosis executed by the image forming apparatus 100 of the first embodiment is performed by the server 200 in FIG. 1. The system configuration diagram of FIG. 1 and the hardware configuration diagrams of the image forming apparatus 100 of FIGS. 2 to 5 used in the first embodiment are also applicable to the second embodiment, and thus description thereof will be omitted.

Figure 14:
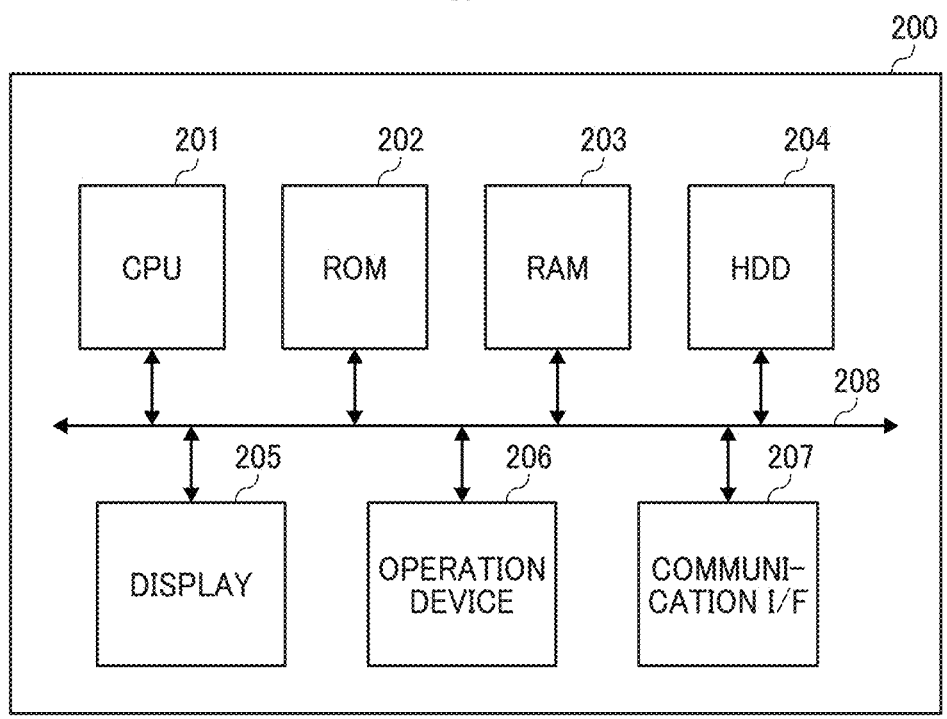
FIG. 14 is a diagram illustrating a hardware configuration of a server according to a second embodiment of the present invention.

FIG. 14 is a diagram illustrating a hardware configuration of the server 200. The server 200 includes a CPU 201, a ROM 202, a RAM 203, an HDD 204, a display 205, an operation device 206, and a communication I/F 207, which are connected to each other via a system bus 208. The operation device 206 includes a keyboard, a mouse, and a touch panel, for example.

The CPU 201 executes an OS and various other application programs stored in the ROM 202 or the HDD 204 by using the RAM 203 as a work area, to thereby control the operation of the entire server 200. The HDD 204 stores at least a part of the failure diagnosis program for executing the failure diagnosis.

The display 205, which functions as a display unit, displays to the operator various information to be used in the operation performed by the operator.

The operation device 206 receives the operation performed by the operator. Herein, "receiving the operation performed by the operator" is a concept including receiving information input in response to the operation performed by the operator.

The communication I/F 207 is a communication device for communication with another apparatus via the network N in conformity with a standard such as Ethernet (registered trademark) or wireless fidelity (Wi-Fi), for example.

The server 200 may further include a medium I/F for writing and reading data to and from a variety of media.

Figure 15:
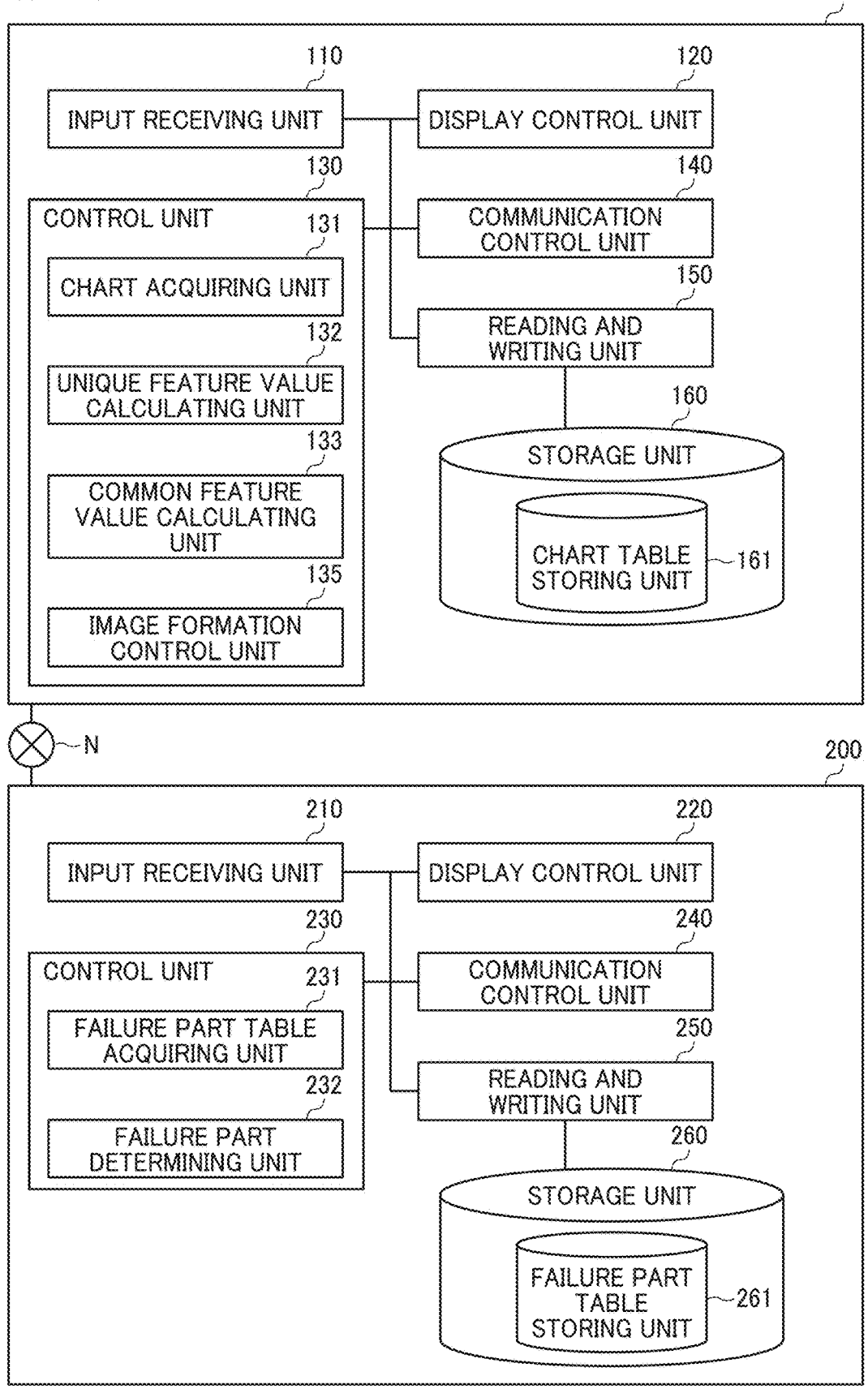
FIG. 15 is a functional block diagram of an image forming apparatus and the server according to the second embodiment.

FIG. 15 is a functional block diagram of an image forming apparatus 101 and the server 200 according to the second embodiment. Unlike the image forming apparatus 100 illustrated in FIG. 6, the image forming apparatus 101 does not include the failure part table storing unit 162 in the storage unit 160. Further, the image forming apparatus 101 does not include the failure part determining unit 134. As to the other parts of the image forming apparatus 101, the image forming apparatus 101 is similar to the image forming apparatus 100 described above with FIG. 6, and thus description thereof will be omitted.

The server 200 will now be described with FIG. 15.

The server 200 includes an input receiving unit 210, a display control unit 220, a control unit 230, a communication control unit 240, a reading and writing unit 250, and a storage unit 260.

The input receiving unit 210 is implemented by the processing of the operation device 206, and executes a function of receiving a variety of inputs performed by the operator.

The display control unit 220 is implemented when the CPU 201 executes programs stored in the ROM 202 or the HDD 204 by using the RAM 203 as a work area. The display control unit 220 executes a function of controlling a display screen displayed on the display 205.

The control unit 230 is implemented when the CPU 201 executes programs stored in the ROM 202 or the HDD 204 by using the RAM 203 as a work area. The control unit 230 executes functions of the entire server 200.

The control unit 230 includes a failure part table acquiring unit 231 and a failure part determining unit 232. Details of the failure part table acquiring unit 231 and the failure part determining unit 232 will be described later with reference to a sequence diagram of a processing procedure.

The communication control unit 240 is implemented by the processing of the communication I/F 207, and executes a function of performing communication using the network N.

The reading and writing unit 250 is implemented when the CPU 201 executes programs stored in the ROM 202 or the HDD 204 by using the RAM 203 as a work area. The reading and writing unit 250 executes functions such as storing a variety of data in the storage unit 260 and reading a variety of data stored in the storage unit 260.

The storage unit 260 is implemented by the processing of the ROM 202 or the HDD 204, and executes a function of storing programs, various setting information used to operate the server 200, and the operation log of the server 200. Alternatively, the storage unit 260 may be implemented by a temporary storage function of the RAM 203.

The storage unit 260 includes a failure part table storing unit 261. The failure part table storing unit 261 previously stores the failure part tables that associate the failure parts with the feature values calculated from the test charts. In accordance with the respective models of image forming apparatuses 101-1 to 101-*n* managed by the server 200, appropriate failure part tables are selected and stored. That is, if the image forming apparatuses 101-1 to 101-*n* managed by the server 200 are the foregoing three models: the second model, i.e., the color (YMCK) model with the developing part, the transferring part, and the PCU part being separated from each other; the fourth model, i.e., the color (YMCK) model with the transferring part and the PCDU part being separated from each other; and the sixth model, i.e., the monochrome (K) model with the developing part, the transferring part, and the PCU part being separated from each other, the failure part table storing unit 261 previously stores the failure part tables illustrated in FIGS. 8, 9, and 10.

Figure 16:
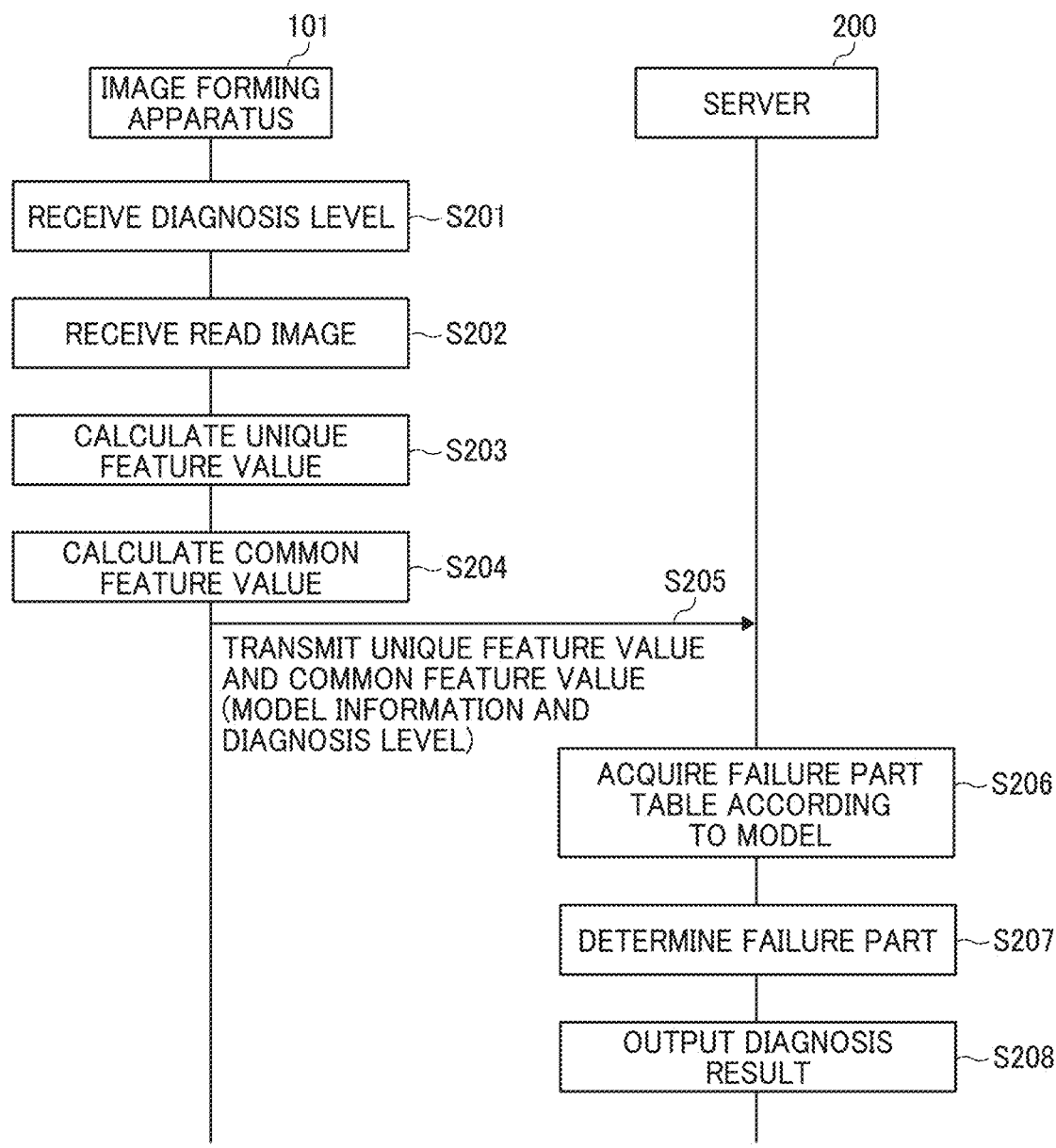
FIG. 16 is a sequence diagram illustrating an example of a sequence of steps of a failure part determination result outputting process according to the second embodiment.

FIG. 16 illustrates an example of a sequence of steps of a failure part determination result outputting process. Steps S101 to S103 in the test chart printing process of the first embodiment in FIG. 11 are also executed in the second embodiment. FIG. 16 illustrates a sequence of steps that starts after steps S101 to S103 when the level of failure diagnosis desired by the operator is input via the operation panel 17 of the image forming apparatus 101. As described later, the operation panel 17 may display a screen that guides the operator to input the level of failure diagnosis.

As a diagnosis level receiving process, the input receiving unit 110 first receives the input diagnosis level (step S201). Herein, the diagnosis level is the level of calculation of the feature values for the diagnosis, and is selectable by the operator between a simplified level and a detailed level.

Then, with the DF 51, for example, the operator causes the image forming apparatus 101 to read the test chart printed at step S103 in FIG. 11. Then, as an image receiving process, the input receiving unit 110 receives image data as a result of reading the test chart (step S202). As described later, the operator may be guided by a display on the operation panel 17 to cause the image forming apparatus 101 to read the test chart.

Then, as a unique feature value calculating process, the unique feature value calculating unit 132 calculates the model-unique feature value from the image data resulting from reading the test chart (step S203). Then, as a common feature value calculating process, the common feature value calculating unit 133 calculates the common feature value from the image data (step S204). Step S203 may precede or follow Step S204. Further, Steps S203 and S204 may be simultaneously performed.

Herein, as a feature value transmitting process, the control unit 130 transmits at least the calculated model-unique feature value and common feature value to the server 200 via the communication control unit 140 (step S205). The control unit 130 may also transmit the model information of the image forming apparatus 101 and the input diagnosis level to the server 200.

As a failure part table acquiring process, the failure part table acquiring unit 231 acquires from the failure part table storing unit 261 the failure part table corresponding to the model information (step S206). Herein, the failure part table acquiring unit 231 may use the model information received from the image forming apparatus 101, or may acquire the failure part table describing the types of feature values matching the received types of feature values.

Then, as a failure part determining process, the failure part determining unit 232 determines the failure part as at least a part of the failure diagnosis result by referring to the received model-unique feature value and common feature value and the acquired failure part table (step S207). Then, as an output process, the control unit 230 outputs the failure diagnosis result including the failure part (step S208). The output of the failure diagnosis result may previously be determined as the storage of the failure diagnosis result into the storage unit 260 of the server 200, the notification of the failure diagnosis result to the call center apparatus 300, or the notification of the failure diagnosis result to the image forming apparatus 101, for example. Alternatively, the output of the failure diagnosis result may be specified by the image forming apparatus 101 at step S205, or may be specified by the server 200 after the completion of the failure diagnosis.

As well as the effects of the first embodiment, the second embodiment provides the following effects. That is, according to the second embodiment, the image forming apparatus 101 does not execute all of the steps of the failure diagnosis, and thus an undesirable situation is avoided in which the operator is unable to use the image forming apparatus 101 during the use of the image forming apparatus 101 for the failure diagnosis.

Further, according to the second embodiment, the failure part tables are stored in the server 200. Therefore, if the failure part tables are updated to more accurate ones with an increase in the number of failure samples, for example, it is possible to provide the latest failure diagnosis to all of the image forming apparatuses 101-1 to 101-n managed by the server 200 simply by updating the failure part tables stored in the server 200.

Examples of transition of the screen displayed on the image forming apparatus 100 of the first embodiment or the image forming apparatus 101 of the second embodiment will now be described with FIGS. 17 to 30. The following description will be given on the assumption that the image forming apparatus 100 of the first embodiment is employed.

Figure 17:
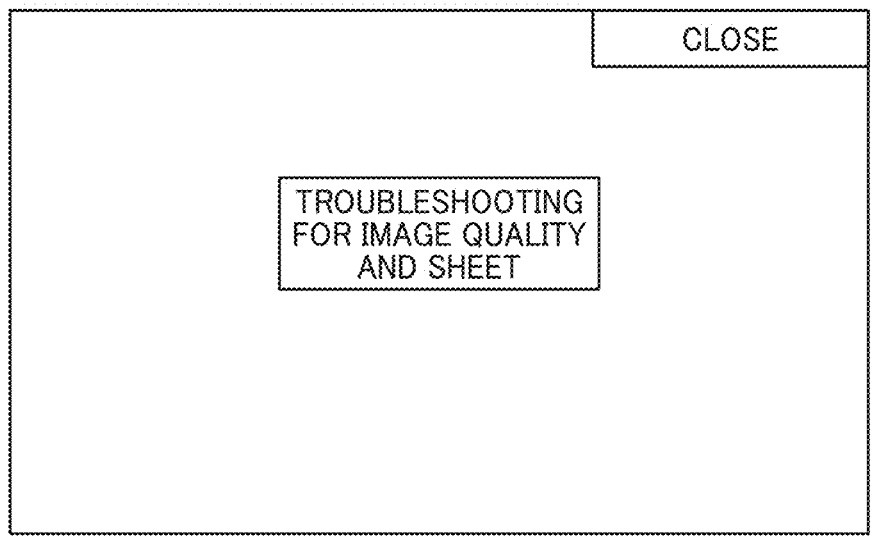
FIGS. 17 to 30 are diagrams respectively illustrating first to fourteenth examples of a screen displayed on the image forming apparatus according to the first or second embodiment.

FIG. 17 illustrates a first example of the screen displayed on the image forming apparatus 100. The screen illustrated in FIG. 17 is displayed in response to pressing of a predetermined button, such as a help button or a support button, in a home screen displayed on the operation panel 17 of the image forming apparatus 100. Hereinafter, this screen may also be referred to as the support screen top.

Figure 18:
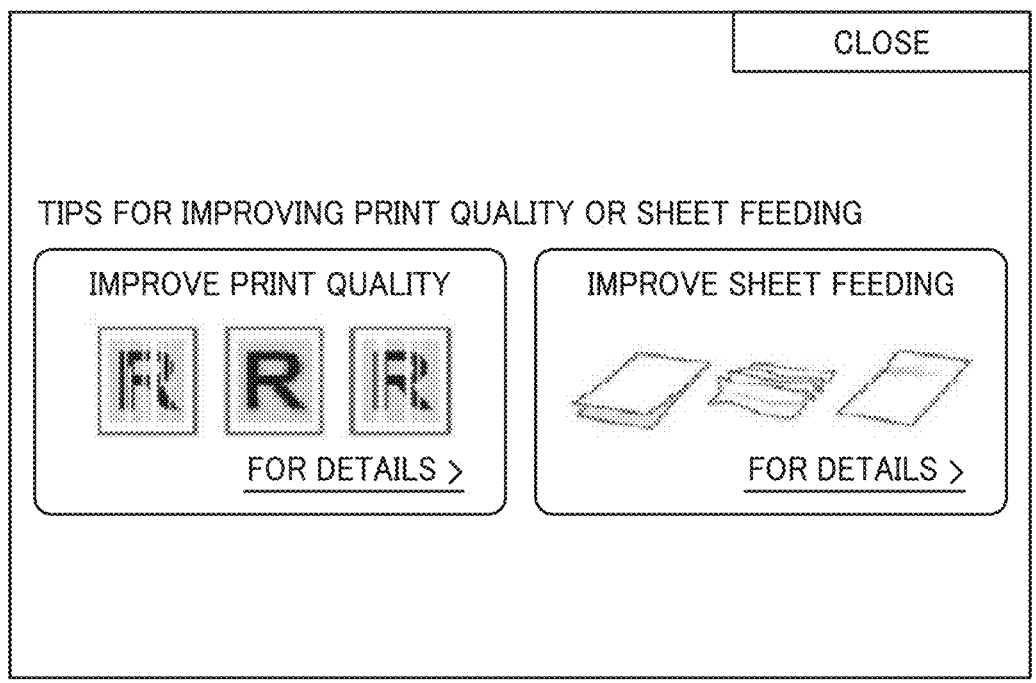

If a button "TROUBLESHOOTING FOR IMAGE QUALITY AND SHEET" is pressed in the support screen top, the screen in FIG. 17 transitions to the screen illustrated in FIG. 18. If a button "CLOSE" is pressed in the support screen top, the screen in FIG. 17 returns to the home screen of the image forming apparatus 100.

By pressing the button "TROUBLESHOOTING FOR IMAGE QUALITY AND SHEET" in the screen illustrated in FIG. 17, the operator of the image forming apparatus 100 is capable of using functions of the image forming apparatus 100 prepared to address the unsatisfactory quality of the image formed by the image forming apparatus 100.

FIG. 18 illustrates a second example of the screen displayed on the image forming apparatus 100. The screen in FIG. 18 is displayed in response to pressing of the button "TROUBLESHOOTING FOR IMAGE QUALITY AND SHEET" in the screen illustrated in FIG. 17.

Figure 19:
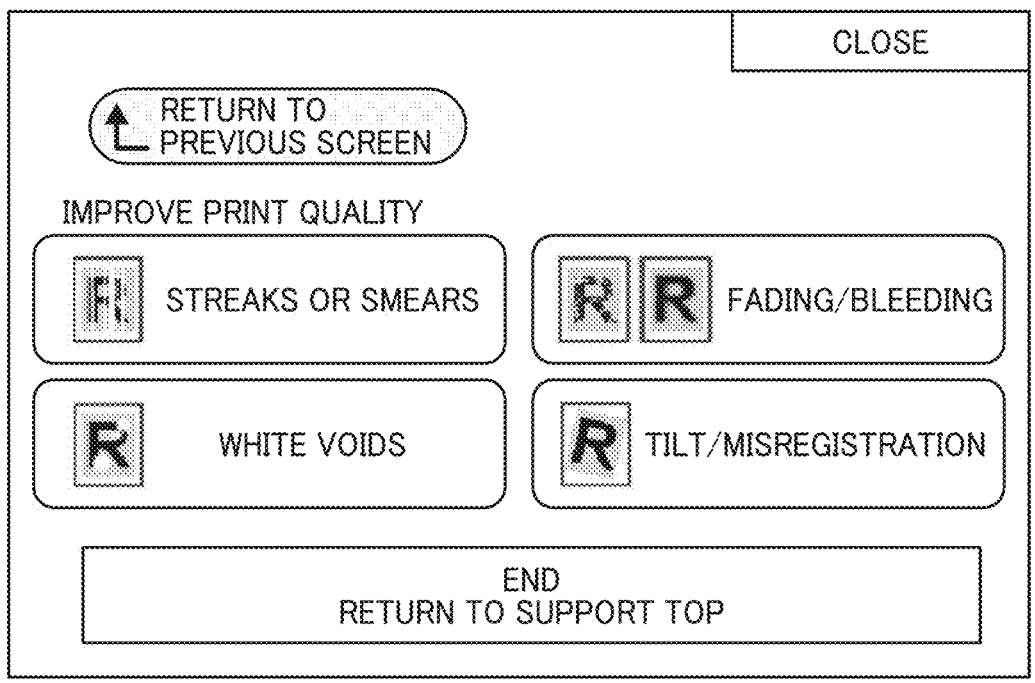

If a button "IMPROVE PRINT QUALITY" is pressed in the screen illustrated in FIG. 18, the screen in FIG. 18 transitions to the screen illustrated in FIG. 19 for guidance on measures executable by the operator to improve the print quality. If a button "IMPROVE SHEET FEEDING" is pressed in the screen in FIG. 18, the screen in FIG. 18 transitions to a screen for guidance on measures executable by the operator to correct a problem in sheet feeding. If a button "CLOSE" is pressed in the screen in FIG. 18, the screen in FIG. 18 returns to the home screen of the image forming apparatus 100.

By pressing the button "IMPROVE PRINT QUALITY" or "IMPROVE SHEET FEEDING" in the screen illustrated in FIG. 18, the operator is capable of using functions of the image forming apparatus 100 that are executed by the operator to improve the print quality or sheet feeding.

FIG. 19 illustrates a third example of the screen displayed on the image forming apparatus 100. The screen in FIG. 19 is displayed in response to pressing of the button "IMPROVE PRINT QUALITY" in the screen illustrated in FIG. 18.

The screen illustrated in FIG. 19 displays four buttons reading "STREAKS OR SMEARS," "FADING/BLEEDING," "WHITE VOIDS," and "TILT/MISREGISTRATION," respectively, as types of the abnormal image. When the operator presses one of the four buttons with a description corresponding to the abnormal image desired to be improved, the screen in FIG. 19 transitions to the screen corresponding to the pressed button. If a button "RETURN TO PREVIOUS SCREEN" is pressed, the screen in FIG. 19 returns to the previous screen. If a button "CLOSE" is pressed, the screen in FIG. 19 returns to the home screen. If a button "END" is pressed, the screen in FIG. 19 returns to the support screen top.

By selecting the type of abnormal image in the screen illustrated in FIG. 19, the operator is capable of receiving support provided by the image forming apparatus 100 in accordance with the type of abnormal image.

As in the example of four buttons illustrated in FIG. 19, the operator inputs the type of abnormal image to the input receiving unit 110 via the operation panel 17. Thereby, the input receiving unit 110 of the image forming apparatus 100 receives the type of abnormal image at step S101 in FIG. 11, making the procedure illustrated in FIG. 11 ready to start.

While the test chart table illustrated in FIG. 7 includes six types of abnormal images, the types of abnormal images displayed on the screen in FIG. 19 are limited to four types. All types of abnormal images associated with the test charts, i.e., the six types of abnormal images in the test chart table in FIG. 7, may be displayed from the beginning to prompt the operator to select one of those types of abnormal images. In many cases, however, detailed identification of the abnormal image is difficult for general users. Therefore, a selection screen such as the screen illustrated in FIG. 19 may be transitioned to another selection screen multiple times to allow the operator to identify the type of abnormal image associated to the test chart in a test chart table such as the one illustrated in FIG. 7.

Figure 20:
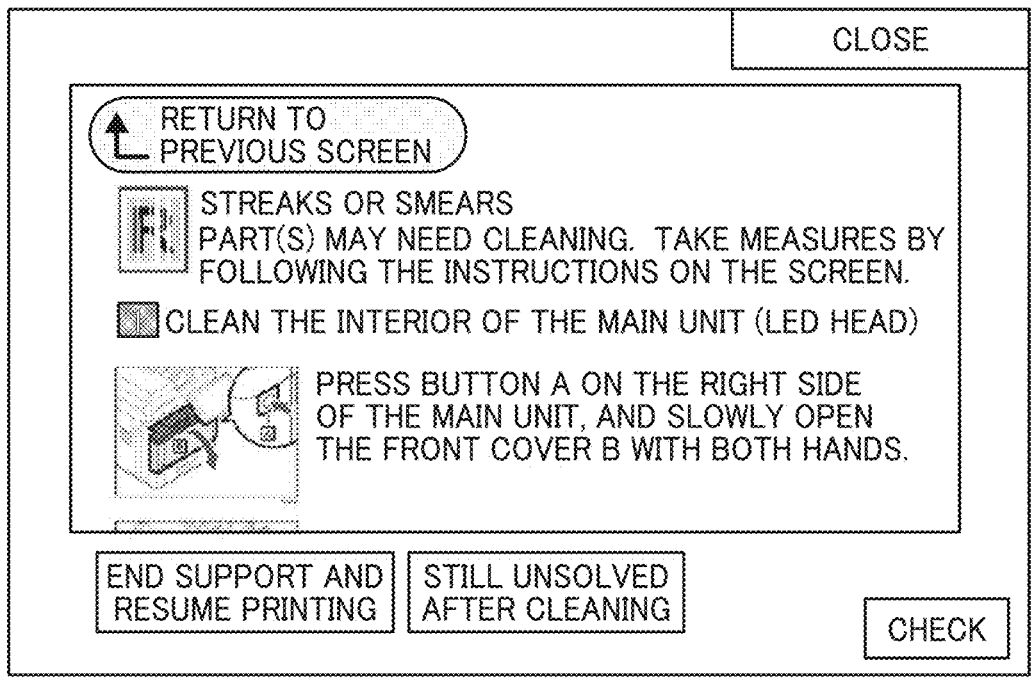

FIG. 20 illustrates a fourth example of the screen displayed on the image forming apparatus 100. The screen in FIG. 20 is displayed in response to pressing of the button "STREAKS OR SMEARS" in the screen illustrated in FIG. 19. As illustrated in FIG. 20, the screen displays measures executable by the operator to address the selected abnormal image. The screen in FIG. 20 displays instructions on cleaning of the interior of the main device 20 of the image forming apparatus 100.

The operator performs the measures by following the instructions on the screen, and presses a button "CHECK." Thereby, a preset image for checking the result is printed. The operator checks the printed image for checking the result. If the abnormality in the image is corrected, the operator presses a button "END SUPPORT AND RESUME PRINTING." If the abnormality in the image is not corrected, the operator presses a button "STILL UNSOLVED AFTER CLEANING."

If the operator presses the button "END SUPPORT AND RESUME PRINTING" in the screen in FIG. 20, the screen closes and transitions to a screen enabling printing, such as the home screen. If the operator presses the button "STILL UNSOLVED AFTER CLEANING" in the screen in FIG. 20, the screen transitions to the screen illustrated in FIG. 21. If a button "RETURN TO PREVIOUS SCREEN" is pressed in the screen in FIG. 20, the screen returns to the previous screen. If a button "CLOSE" is pressed in the screen in FIG. 20, the screen returns to the home screen.

By pressing the button "STILL UNSOLVED AFTER CLEANING" in the screen in FIG. 20, the operator is capable of executing the failure diagnosis provided by the image forming apparatus 100.

Figure 21:
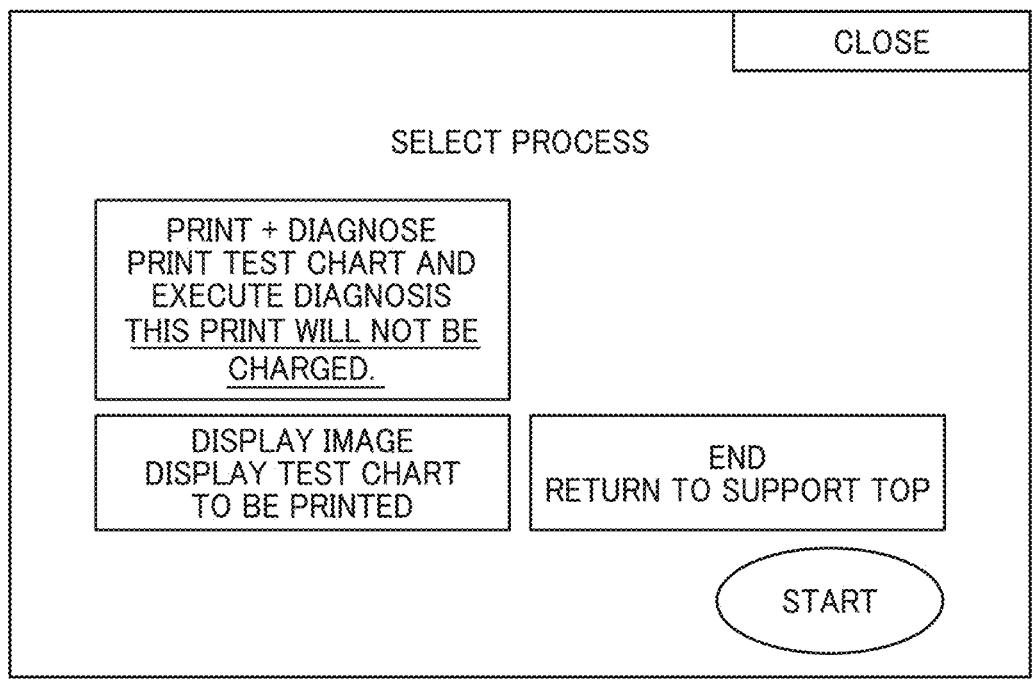

FIG. 21 illustrates a fifth example of the screen displayed on the image forming apparatus 100. The screen in FIG. 21 is displayed in response to pressing of the button "STILL UNSOLVED AFTER CLEANING" in the screen illustrated in FIG. 20.

If the operator presses a button "START" in the screen in FIG. 21 when a button "PRINT+DIAGNOSE" is pressed and selected, step S103 in FIG. 11 is executed to print the test chart for failure diagnosis. If the operator presses a button "DISPLAY IMAGE," the test chart to be printed is displayed on the operation panel 17. If the operator presses a button "END," the screen in FIG. 21 returns to the support screen top.

By pressing the button "START" in the screen in FIG. 21 when the button "PRINT+DIAGNOSE" is selected, the operator is capable of printing the test chart for diagnosing the abnormal image desired to be improved.

Figure 22:
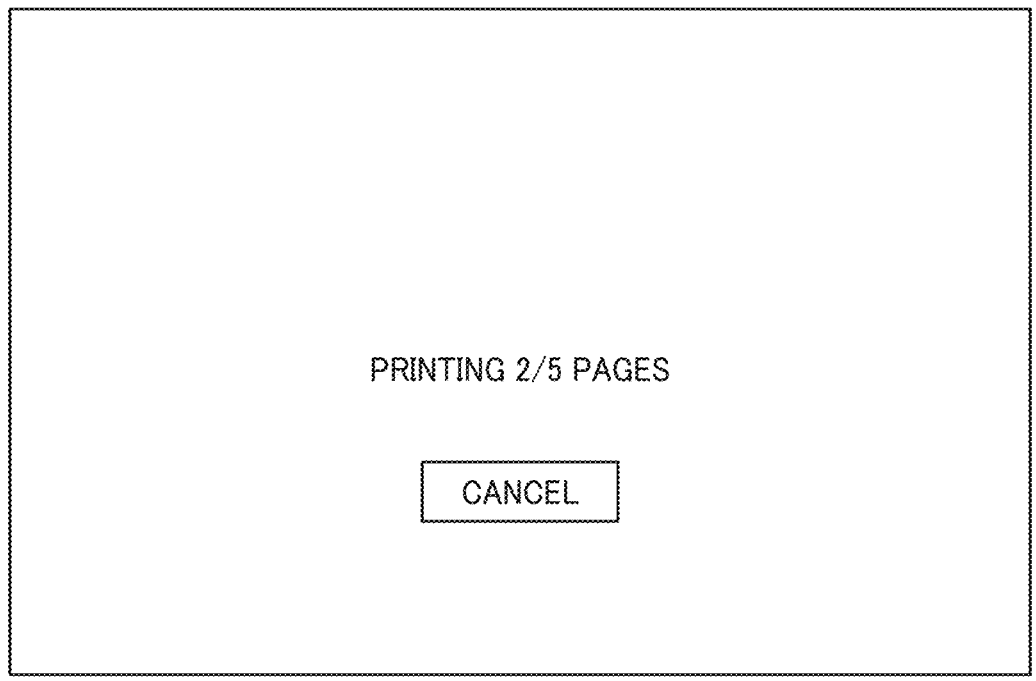

FIG. 22 illustrates a sixth example of the screen displayed on the image forming apparatus 100. The screen in FIG. 22 is displayed in response to pressing of the button "START" in the screen in FIG. 21 when the button "PRINT+DIAGNOSE" is selected. The screen in FIG. 22 informs the operator of the progress of the printing process. The operator is capable of cancelling the printing process during the printing process by pressing a button "CANCEL" in the screen in FIG. 22.

Figure 23:
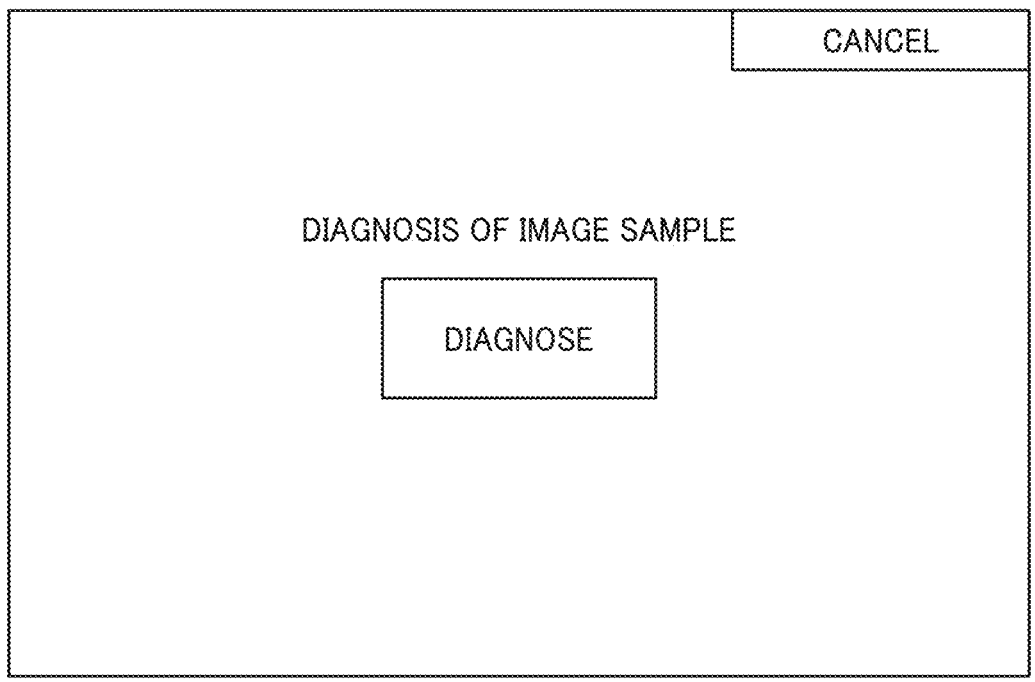

FIG. 23 illustrates a seventh example of the screen displayed on the image forming apparatus 100. The screen in FIG. 23 is displayed when the printing of the test chart by the image forming apparatus 100 is completed.

If the operator presses a button "DIAGNOSE" in the screen in FIG. 23, the failure diagnosis continues. By pressing a button "CANCEL" in the screen in FIG. 23, the operator is capable of ending image diagnosis without further proceeding with the image diagnosis. A button "CANCEL" appearing in the following description has a similar function, unless otherwise noted.

Figure 24:
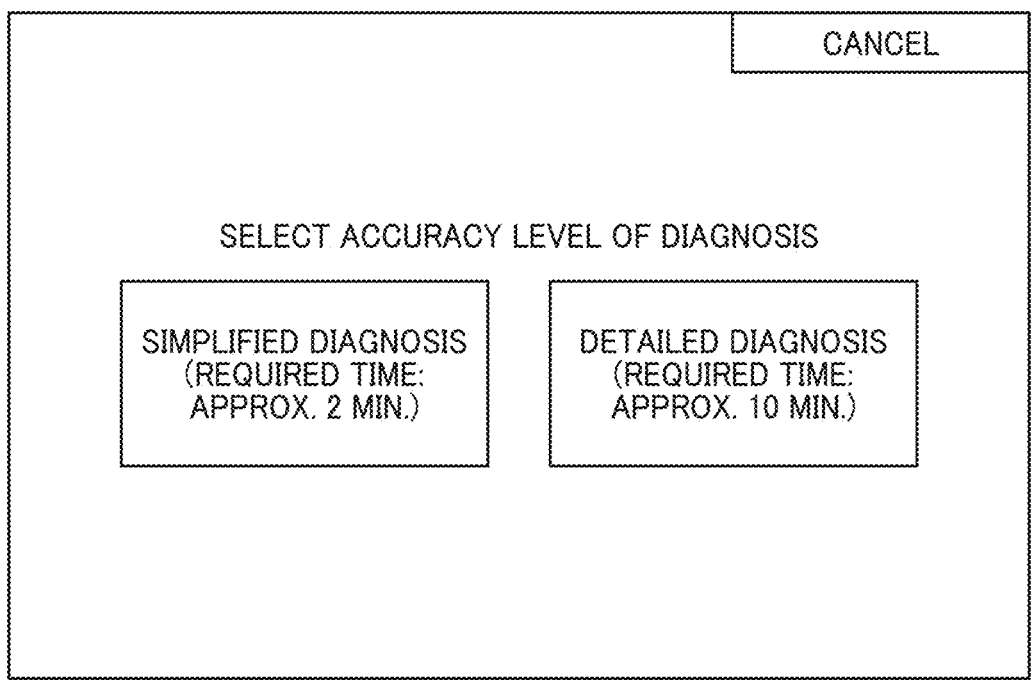

FIG. 24 illustrates an eighth example of the screen displayed on the image forming apparatus 100. The screen in FIG. 24 is displayed in response to pressing of the button "DIAGNOSE" in the screen in FIG. 23.

If a button "SIMPLIFIED DIAGNOSIS" is pressed, the input receiving unit 110 receives an input indicating that simplified diagnosis that completes in a short time (e.g., two minutes) has been selected. If a button "DETAILED DIAGNOSIS" is pressed, the input receiving unit 110 receives an input indicating that detailed diagnosis that takes an extended time (e.g., ten minutes) has been selected. That is, the input receiving unit 110 receives the diagnosis level at step S104 in FIG. 12 or at step S201 in FIG. 16, making the procedure in FIG. 12 or the procedure in FIG. 16 ready to start.

The operator is capable of executing the failure diagnosis by selecting one of the buttons in the screen in FIG. 24, i.e., by selecting one of different diagnosis levels.

Figure 25:
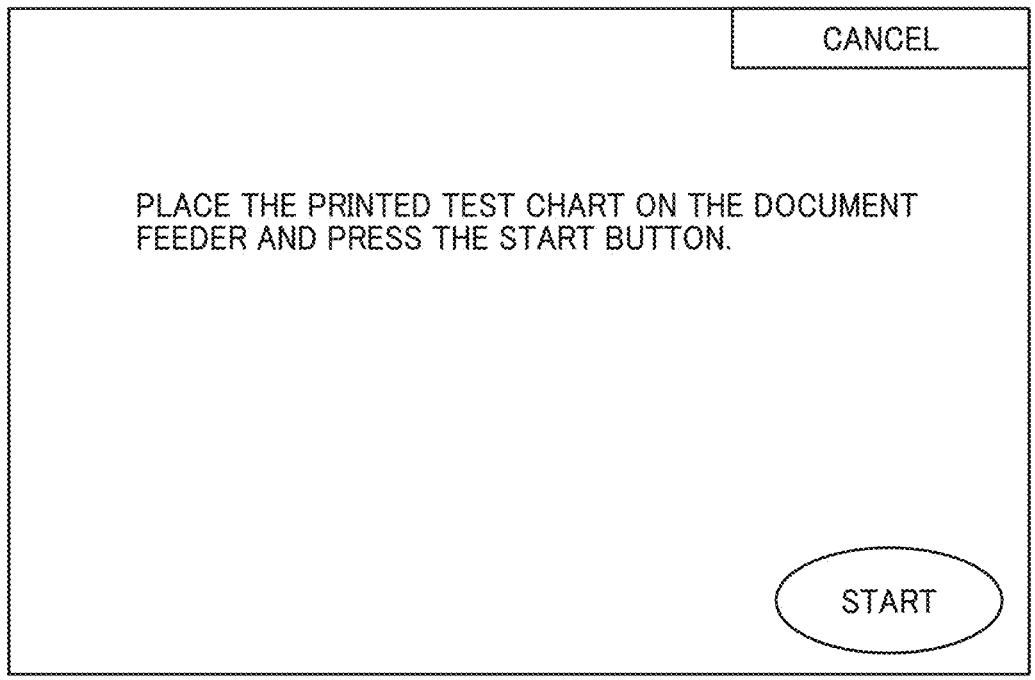

FIG. 25 illustrates a ninth example of the screen displayed on the image forming apparatus 100. The screen in FIG. 25 is displayed in response to pressing of the button "SIMPLIFIED DIAGNOSIS" or "DETAILED DIAGNOSIS" in the screen in FIG. 24.

The screen in FIG. 25 displays to the operator an instruction "PLACE THE PRINTED TEST CHART ON THE DOCUMENT FEEDER AND PRESS THE START BUTTON."

With reference to this screen, the operator places the printed test chart on the DF 51 and presses a button "START," and the image reading device 1 reads the test chart and generates image data of the test chart.

The screen illustrated in FIG. 25 enables the operator to more reliably perform image diagnosis with the test chart for the failure diagnosis.

Figure 26:
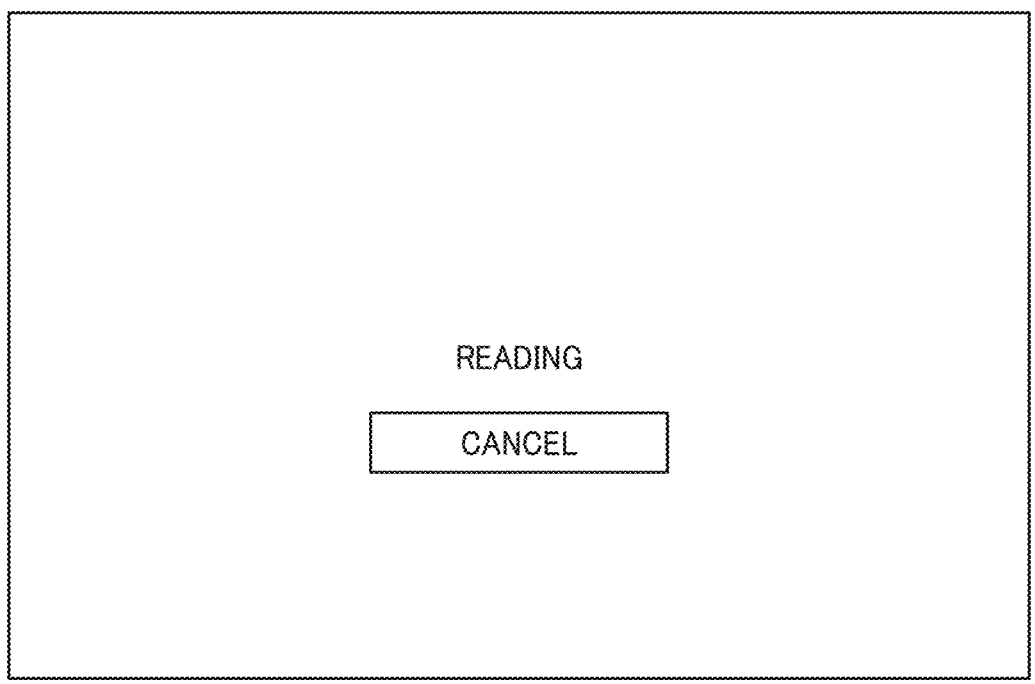

FIG. 26 illustrates a tenth example of the screen displayed on the image forming apparatus 100. The screen in FIG. 26 is displayed in response to pressing of the button "START" in the screen in FIG. 25. The screen in FIG. 26 informs the operator that the test chart reading process is being performed. The operator is capable of cancelling the test chart reading process during the test chart reading process by pressing a button "CANCEL" in the screen in FIG. 26.

Figure 27:
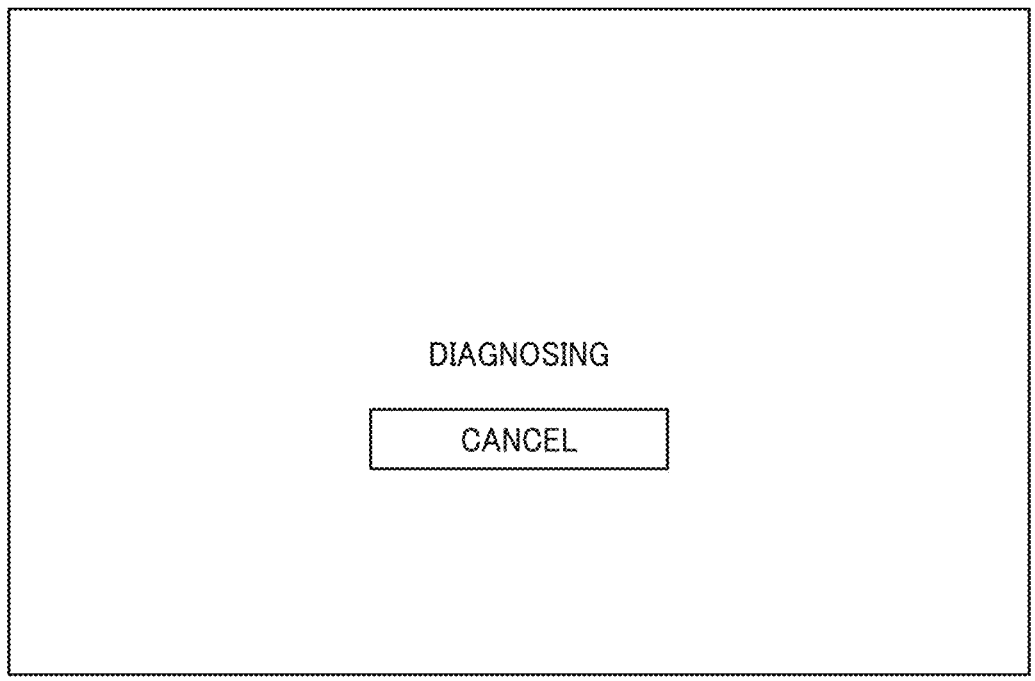

FIG. 27 illustrates an eleventh example of the screen displayed on the image forming apparatus 100. The screen in FIG. 27 is displayed subsequently to the screen in FIG. 26 after the test chart reading process is completed. The screen in FIG. 27 informs the operator that the failure diagnosis based on the test chart is being performed. The operator is capable of cancelling the failure diagnosis during the failure diagnosis by pressing a button "CANCEL" in the screen in FIG. 27.

If the simplified diagnosis is selected by the operator, the waiting times for the operator with the screens in FIGS. 26 and 27 are reduced.

Figure 28:
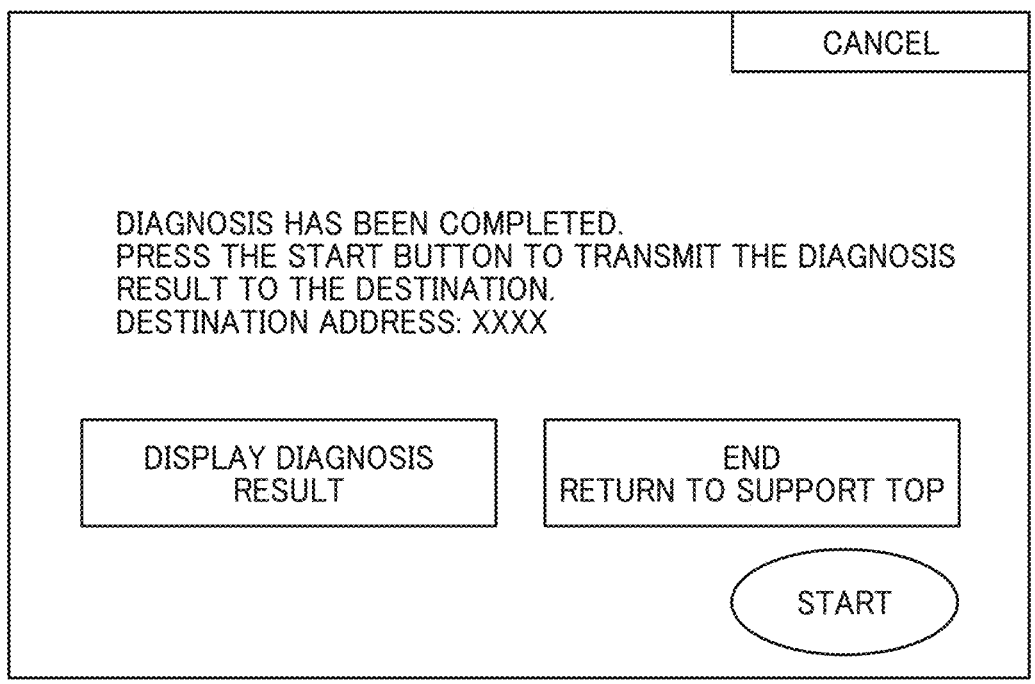

FIG. 28 illustrates a twelfth example of the screen displayed on the image forming apparatus 100. The screen in FIG. 28 is displayed subsequently to the screen in FIG. 27 after the failure diagnosis is completed.

If a button "START" is pressed in the screen in FIG. 28, the failure diagnosis result is transmitted to the previously registered transmission destination, such as the server 200 or the call center apparatus 300, for example. If a button "DISPLAY DIAGNOSIS RESULT" is pressed, the failure diagnosis result is displayed on the screen. The screen in FIG. 28 may also include a print button for printing the failure diagnosis result. If a button "END" is pressed, the screen in FIG. 28 returns to the support screen top.

When the button "START" is pressed, the input receiving unit 110 performs the output instruction receiving process at step S109 in FIG. 13, and the control unit 130 performs the output process at step S110 in FIG. 13. Alternatively, the screen illustrated in FIG. 28 may be displayed on the display 205 of the server 200 in the second embodiment before step S208, and the operator of the server 200 may make a selection on the screen in FIG. 28 via the operation device 206 of the server 200.

On the screen illustrated in FIG. 28, the operator is capable of outputting the failure diagnosis result by a desired output method.

Figure 29:
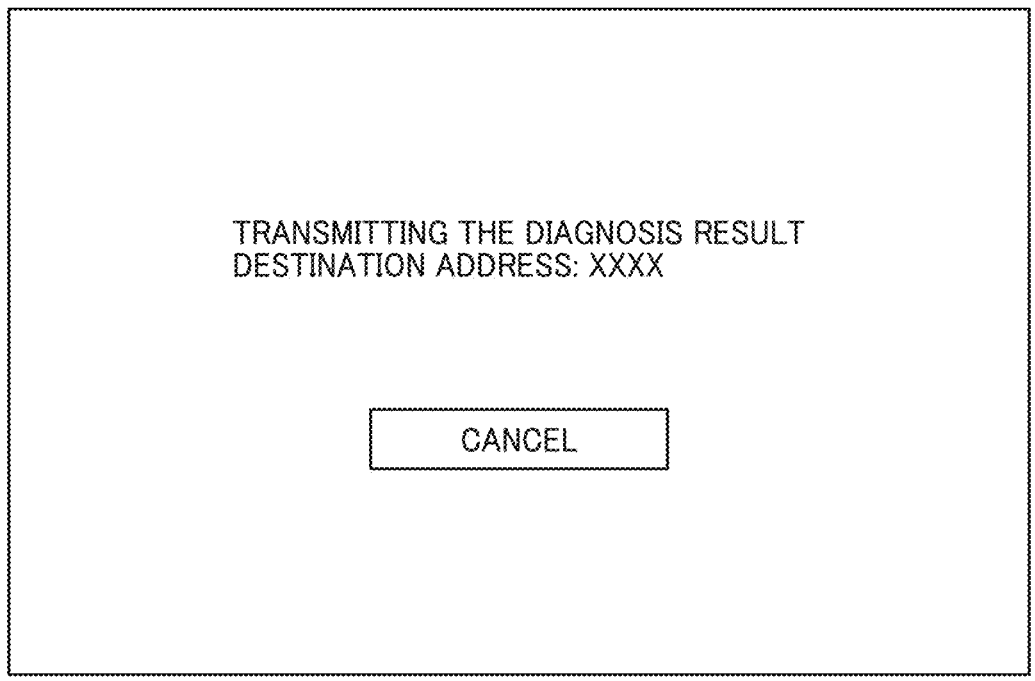

FIG. 29 illustrates a thirteenth example of the screen displayed on the image forming apparatus 100. The screen in FIG. 29 is displayed in response to pressing of the button "START" in the screen in FIG. 28. The screen in FIG. 29 informs the operator that the failure diagnosis result is being transmitted as the output of the failure diagnosis result. The operator is capable of cancelling the transmission of the failure diagnosis result during the transmission by pressing a button "CANCEL" in the screen in FIG. 29.

Figure 30:
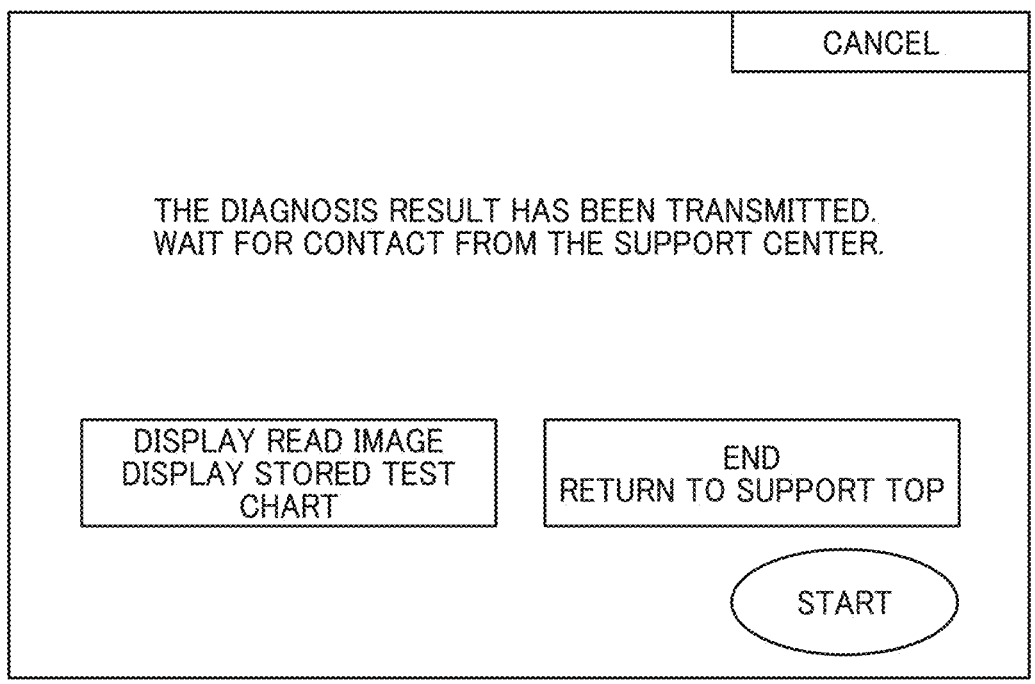

FIG. 30 illustrates a fourteenth example of the screen displayed on the image forming apparatus 100. The screen in FIG. 30 is displayed subsequently to the screen in FIG. 29 after the transmission of the failure diagnosis result is completed.

If a button "START" is pressed in the screen in FIG. 30 when a button "DISPLAY READ IMAGE" is pressed and selected, the image data generated from the read test chart is displayed on the operation panel 17. If a button "END" is pressed in the screen in FIG. 30, the screen in FIG. 30 returns to the support screen top.

Similarly to the screen in FIG. 28, the screens in FIGS. 29 and 30 may be displayed on the display 205 of the server 200 in the second embodiment, and the operator of the server 200 may operate buttons on the screens in FIGS. 29 and 30 via the operation device 206 of the server 200.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A failure diagnosis apparatus comprising:
   processing circuitry configured to cause the failure diagnosis apparatus to,
   calculate a unique feature value based on image data read from an image formed by an image forming apparatus, the unique feature value being dependent on a model of the image forming apparatus, and the unique feature value including a plurality of unique feature values,
   calculate a common feature value based on the image data, the common feature value being common to a plurality of models of image forming apparatuses,
   determine a failure part based on at least one of the unique feature value and the common feature value, the failure part being a component part that forms the image forming apparatus and has an abnormality,
   select one or more unique feature values, from the plurality of unique feature values, in accordance with the model of the image forming apparatus, and
   calculate the unique feature values for only the common feature value and the selected unique feature values.

2. The failure diagnosis apparatus of claim 1, further comprising:
   a memory configured to store a failure part table that associates each of the unique feature value and the common feature value with at least a part of the component part that forms the image forming apparatus,
   wherein the processing circuitry is further configured to cause the failure diagnosis apparatus to determine the failure part as the component part associated with at least one of the unique feature value and the common feature value in the failure part table.

3. The failure diagnosis apparatus of claim 2, wherein the memory is further configured to store the failure part table in accordance with the model of the image forming apparatus.

4. The failure diagnosis apparatus of claim 2, wherein the memory is further configured to store an image of a test chart,
   wherein the test chart is formed by the image forming apparatus, and
   wherein the image data is read from the image of the test chart.

5. The failure diagnosis apparatus of claim 1, wherein the plurality of models of image forming apparatuses are different in the component parts forming the plurality of models of image forming apparatuses.

6. The failure diagnosis apparatus of claim 1, wherein the plurality of models of image forming apparatuses are different in number of colors output in image formation by the plurality of models of image forming apparatuses.

7. The failure diagnosis apparatus of claim 1, wherein the failure diagnosis apparatus is implemented by the image forming apparatus.

8. The failure diagnosis apparatus of claim 7, wherein the processing circuitry is further configured to cause the image forming apparatus to print a result of the determination of the failure part.

9. The failure diagnosis apparatus of claim 1, wherein the processing circuitry is further configured to cause the failure diagnosis apparatus to transmit a result of the determination of the failure part to a preset destination.

10. The failure diagnosis apparatus of claim 1, wherein the processing circuitry is further configured to cause the failure diagnosis apparatus to store a result of the determination of the failure part in a memory.

11. The failure diagnosis apparatus of claim 1, wherein
the image formed by the image forming apparatus is a test chart,
the test chart includes a plurality of test charts, and
the processing circuitry is further configured to cause the image forming apparatus to print a number of the plurality of test charts, the number of the plurality of test charts based on a test chart table.

12. The failure diagnosis apparatus of claim 1, wherein the processing circuitry is further configured to cause the failure diagnosis apparatus to calculate the unique feature value and the common feature value based on a diagnosis level setting.

13. A failure diagnosis system comprising:
a server including first processing circuitry; and
at least one image forming apparatus including second processing circuitry,
the first processing circuitry and the second processing circuitry being configured to operate in cooperation to
calculate a unique feature value based on image data read from an image formed by the at least one image forming apparatus, the unique feature value being dependent on a model of the at least one image forming apparatus, and the unique feature value including a plurality of unique feature values,
calculate a common feature value based on the image data, the common feature value being common to a plurality of models of image forming apparatuses,
determine a failure part based on at least one of the unique feature value and the common feature value, the failure part being a component part that forms the at least one image forming apparatus and has an abnormality,
select one or more unique feature values, from the plurality of unique feature values, in accordance with the model of the image forming apparatus, and
calculate the unique feature values for only the common feature value and the selected unique feature values.

14. A failure diagnosis method comprising:
acquiring image data from an image formed by an image forming apparatus;
calculating, from the image data, a common feature value that is common to a plurality of models of image forming apparatuses;
calculating, from the image data, a unique feature value that is dependent on a model of the image forming apparatus, the unique feature value including a plurality of unique feature values;
determining a failure part based on at least one of the common feature value and the unique feature value, the failure part being a component part that forms the image forming apparatus and has an abnormality;
selecting one or more unique feature values, from the plurality of unique feature values, in accordance with the model of the image forming apparatus; and
calculating the unique feature values for only the common feature value and the selected unique feature values.

15. A non-transitory recording medium storing a plurality of instructions which, when executed by one or more processors, cause the processors to perform a failure diagnosis method comprising:
acquiring image data from an image formed by an image forming apparatus;
calculating, from the image data, a common feature value that is common to a plurality of models of image forming apparatuses;
calculating, from the image data, a unique feature value that is dependent on a model of the image forming apparatus, the unique feature value including a plurality of unique feature values;
determining a failure part based on at least one of the common feature value and the unique feature value, the failure part being a component part that forms the image forming apparatus and has an abnormality;
selecting one or more unique feature values, from the plurality of unique feature values, in accordance with the model of the image forming apparatus; and
calculating the unique feature values for only the common feature value and the selected unique feature values.

* * * * *